US011877316B2

(12) United States Patent
Huang et al.

(10) Patent No.: US 11,877,316 B2
(45) Date of Patent: Jan. 16, 2024

(54) APPARATUSES AND METHODS FOR ESTABLISHING AN INITIAL ACCESS

(71) Applicant: Panasonic Intellectual Property Corporation of America, Torrance, CA (US)

(72) Inventors: Lei Huang, Singapore (SG); Hidetoshi Suzuki, Kanagawa (JP); Lilei Wang, Beijing (CN); Tien Ming Benjamin Koh, Singapore (SG); Chan Wah Ng, Singapore (SG); Yang Kang, Singapore (SG); Hong Cheng Michael Sim, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 508 days.

(21) Appl. No.: 17/263,833

(22) PCT Filed: Jul. 31, 2018

(86) PCT No.: PCT/CN2018/097765
§ 371 (c)(1),
(2) Date: Jan. 27, 2021

(87) PCT Pub. No.: WO2020/024102
PCT Pub. Date: Feb. 6, 2020

(65) Prior Publication Data
US 2021/0307061 A1 Sep. 30, 2021

(51) Int. Cl.
*H04W 74/00* (2009.01)
*H04W 74/08* (2009.01)

(52) U.S. Cl.
CPC ..... *H04W 74/006* (2013.01); *H04W 74/0808* (2013.01)

(58) Field of Classification Search
None
See application file for complete search history.

(56) References Cited

U.S. PATENT DOCUMENTS

| 11,729,782 | B2 * | 8/2023 | Zhang | H04W 52/242 |
| | | | | 370/336 |
| 2019/0313449 | A1 * | 10/2019 | Tsai | H04W 72/1268 |
| 2021/0289548 | A1 * | 9/2021 | Murray | H04W 72/23 |

OTHER PUBLICATIONS

Qualcomm Incorporated, "Initial access and mobility proedures for NR unlicensed," R1-1807390, Agenda item: 7.6.4.2, 3GPP TSG RAN WG1 Meeting #93, Busan, Korea, May 21-25, 2018. (5 pages).

(Continued)

*Primary Examiner* — Xavier S Wong
(74) *Attorney, Agent, or Firm* — Seed IP Law Group LLP

(57) ABSTRACT

The present disclosure provides apparatuses and methods for establishing an initial access. The apparatuses include a terminal which comprises a receiver which, in operation, is configured to receive candidate synchronization signal/ physical broadcast channel blocks (SSBs) in a synchronization signal (SS) burst set, the candidate SSBs being transmitted within one or more SSB channel occupancy time (SSB COT) from a base station. The terminal further comprises a transmitter which, in operation, is configured to transmit a physical random access channel (PRACH) preamble on a PRACH occasion (RO) to the base station, the RO being associated with one SSB among the received candidate SSBs.

10 Claims, 13 Drawing Sheets

(56) References Cited

OTHER PUBLICATIONS

International Search Report, dated Apr. 28, 2019, for corresponding International Application No. PCT/CN2018/097765, 2 pages.
ITL, "Initial access and mobility for NR-U," R1-1807142, Agenda Item: 7.6.4.2, 3GPP TSG RAN WG1 Meeting #93, Busan, Korea, May 21-25, 2018, 6 pages.

* cited by examiner

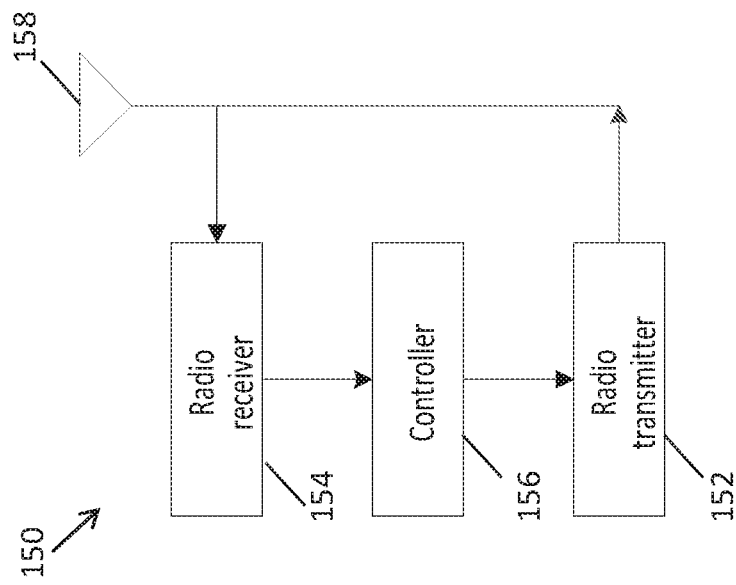
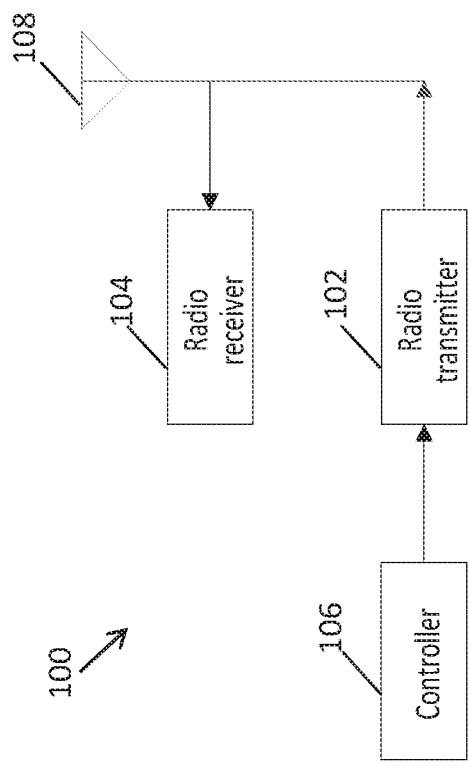

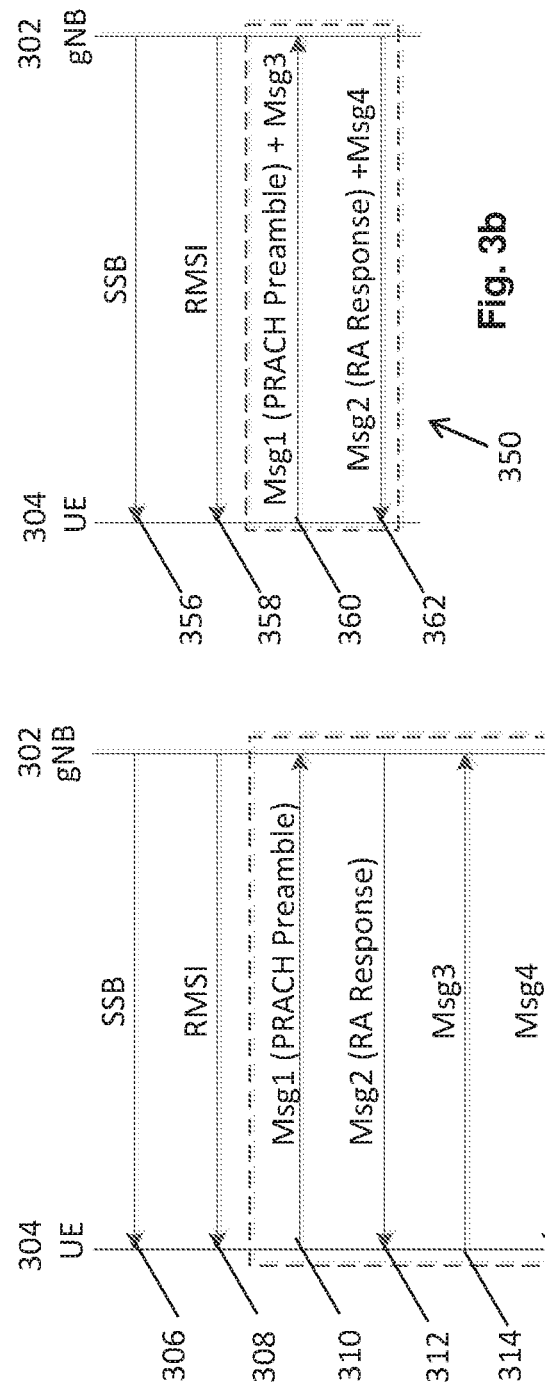

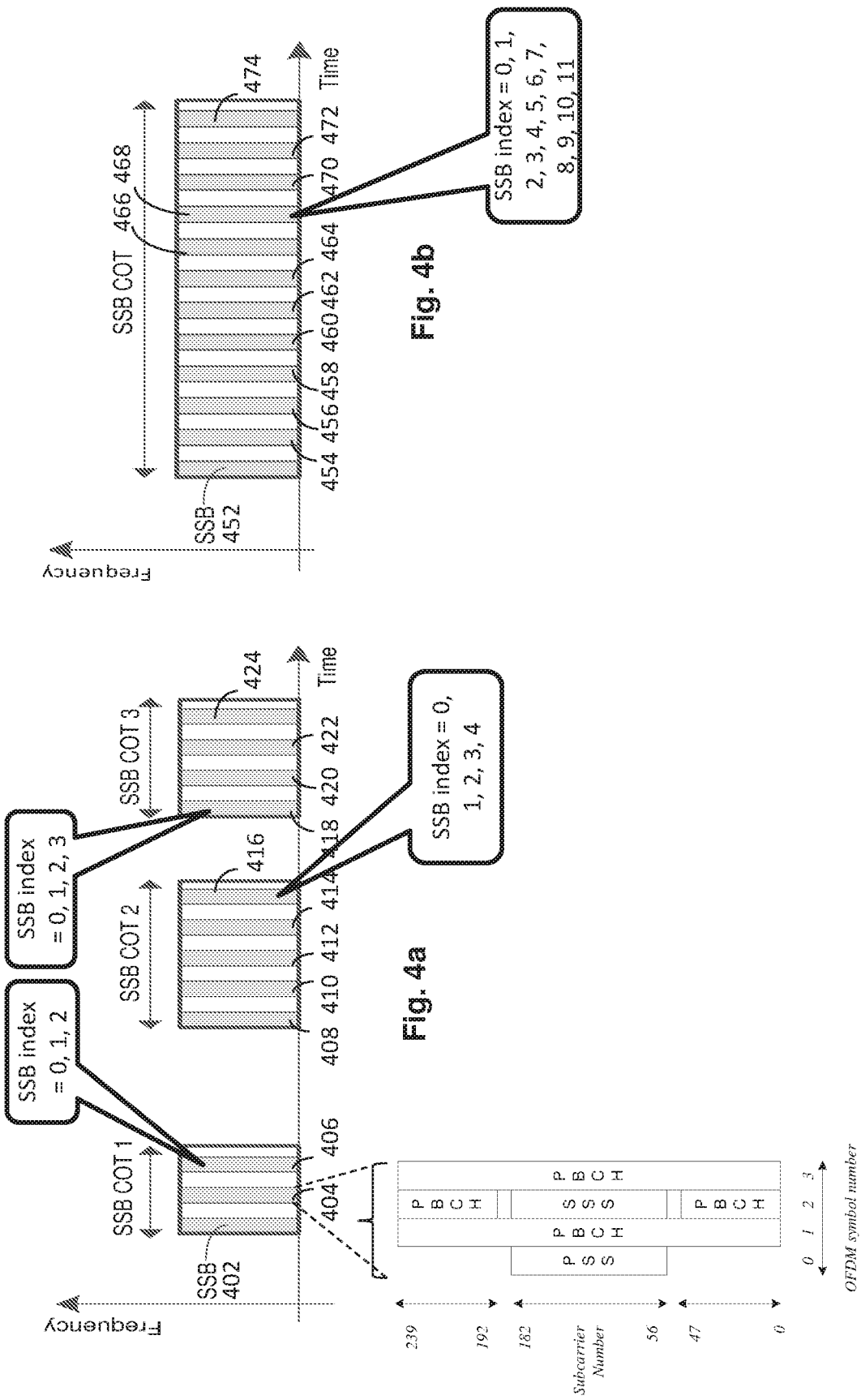

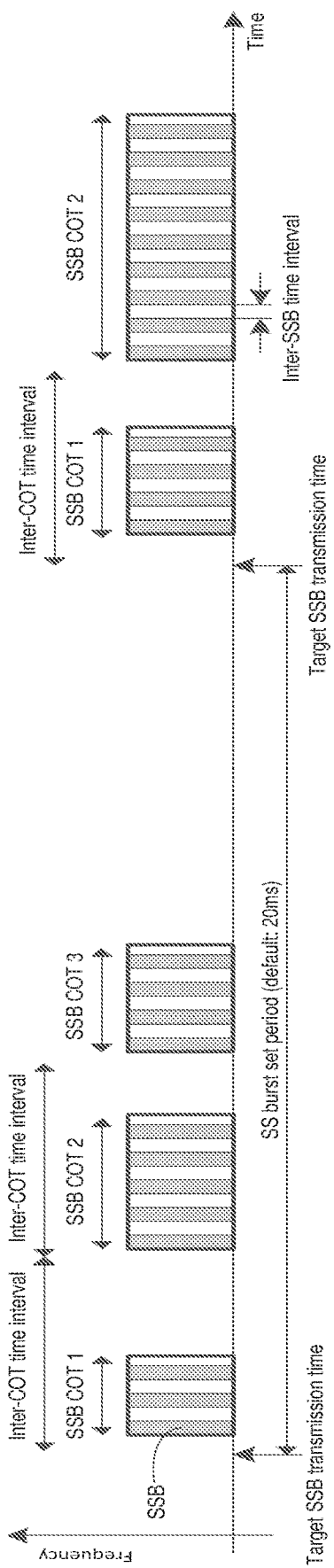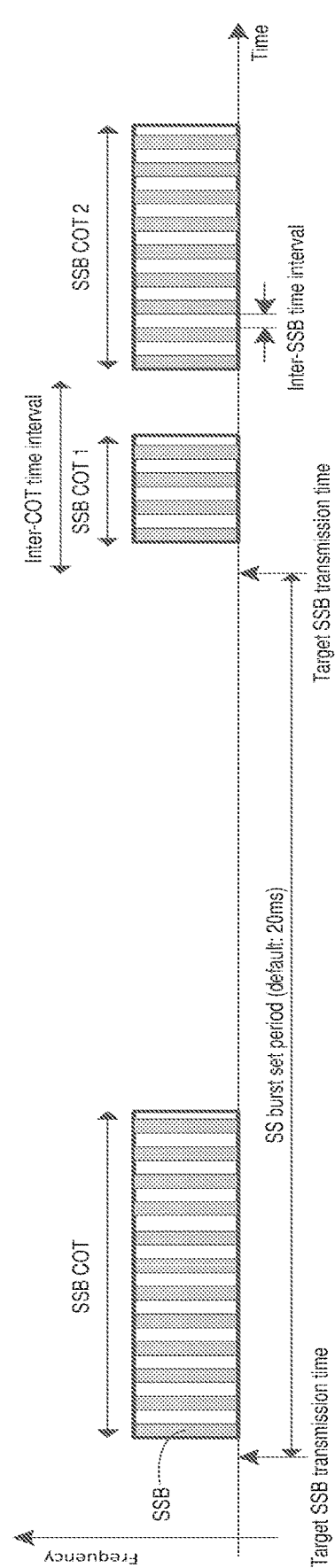
Fig. 5a
Fig. 5b

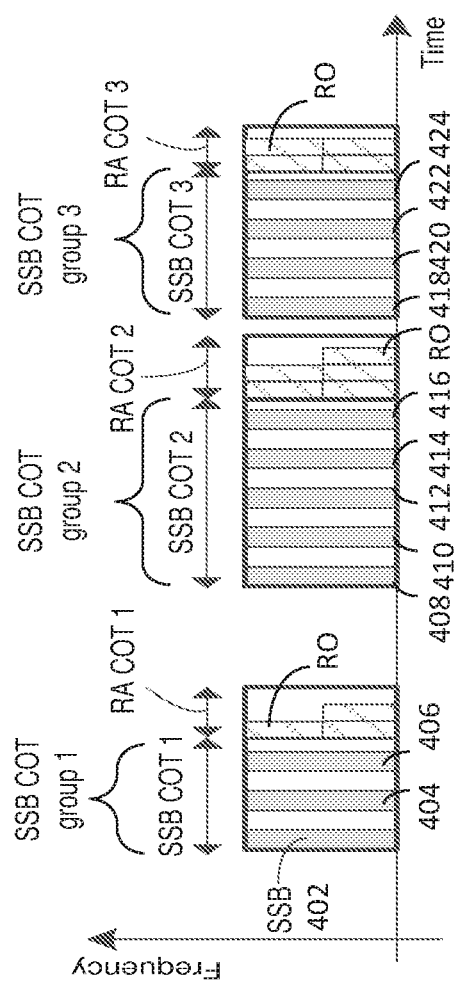
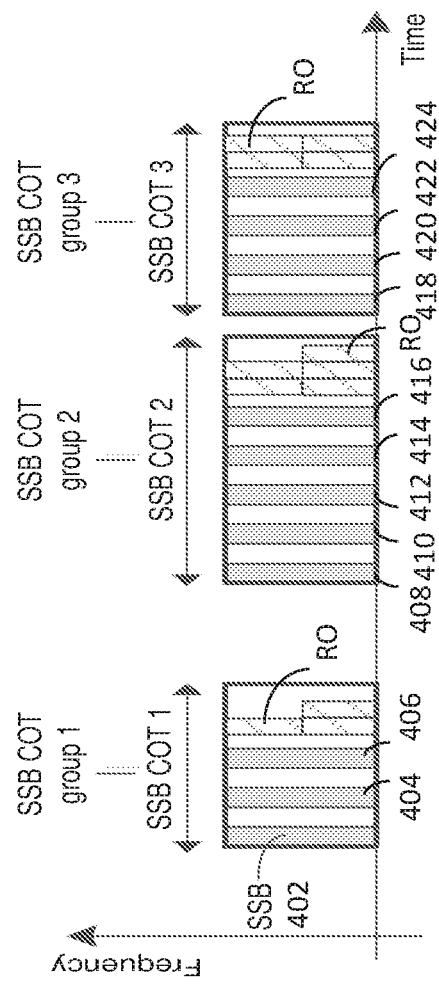

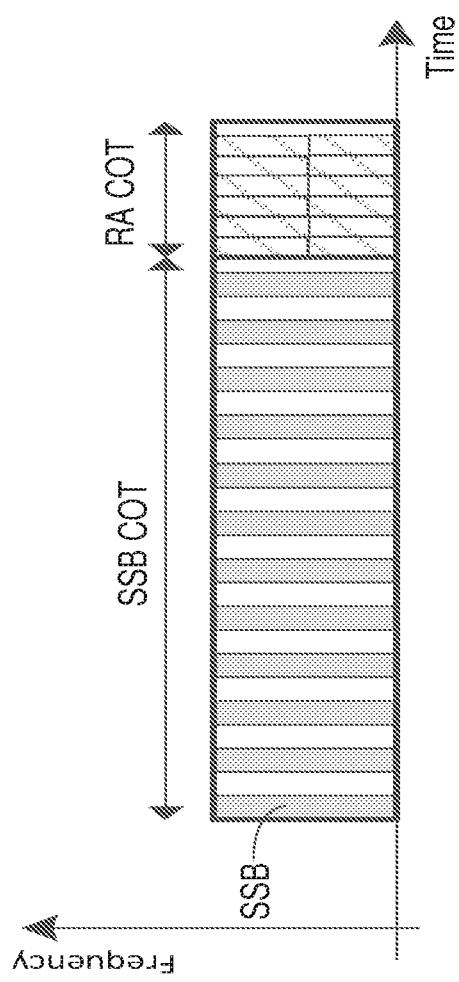
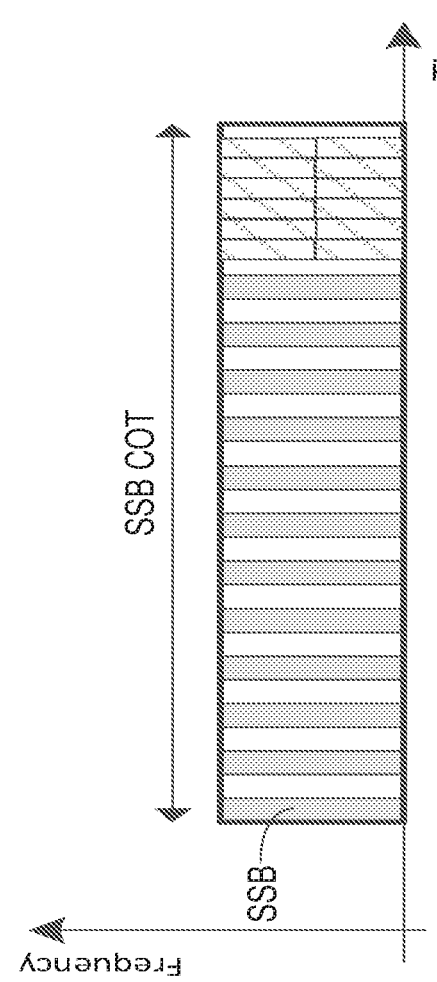
Fig. 8a
Fig. 8b

APPARATUSES AND METHODS FOR ESTABLISHING AN INITIAL ACCESS

TECHNICAL FIELD

The following disclosure relates to apparatuses and methods for establishing an initial access in $5^{th}$ generation (5G) communications, and more particularly to apparatuses and methods for establishing an initial access in new radio (NR) operating in unlicensed bands.

BACKGROUND

In the standardization of 5G, a NR access technology that not necessarily has backward compatibility with long term evolution (LTE)/LTE-Advanced technologies has been discussed in the $3^{rd}$ generation partnership project (3GPP) and is considered NR stand-alone technology.

In NR, as with LTE license-assisted access (LTE-LAA), operations in unlicensed bands are expected. In order to implement NR stand-alone in unlicensed bands, introducing an initial access procedure into unlicensed bands, which has not been introduced into LTE-LAA, has been discussed.

A listen before talk (LBT) procedure is required for NR channel access in unlicensed bands, depending on the country, frequency and conditions. However, there has been no sufficient discussion on communication apparatuses and communication methods for establishing NR initial access in unlicensed bands according to LBT.

There is thus a need for communication apparatuses and methods that can solve the above mentioned drawbacks to ensure efficient and reliable communication for establishing initial access and to improve NR downlink (DL) and uplink (UL) throughput. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates providing apparatuses for establishing an initial access in an efficient and reliable manner.

According to a first aspect of the present disclosure, there is provided a terminal for establishing an initial access. The terminal comprises a receiver which, in operation, is configured to receive candidate synchronization signal/physical broadcast channel blocks (SSBs) in a synchronization signal (SS) burst set, the candidate SSBs being transmitted within one or more SSB channel occupancy time (SSB COT) from a base station; and a transmitter which, in operation, is configured to transmit a physical random access channel (PRACH) preamble on a PRACH occasion (RO) to the base station, the RO being associated with one SSB among the received candidate SSBs.

According to a second aspect of the present disclosure, there is provided a base station for establishing an initial access. The base station comprises a transmitter which, in operation, is configured to transmit candidate synchronization signal/physical broadcast channel blocks (SSBs) in a synchronization signal (SS) burst set within one or more SSB channel occupancy time (SSB COT) to a terminal; and a receiver which, in operation, is configured to receive a physical random access channel (PRACH) preamble on a PRACH occasion (RO) from the terminal, the RO being associated with one SSB among the received candidate SSBs.

According to a third aspect of the present disclosure, there is provided a method for establishing an initial access. The method comprises receiving, at a terminal, candidate synchronization signal/physical broadcast channel blocks (SSBs) in a synchronization signal (SS) burst set, the candidate SSBs being transmitted within one or more SSB channel occupancy time (SSB COT) from a base station; and transmitting, from the terminal, a physical random access channel (PRACH) preamble on a PRACH occasion (RO) to the base station, the RO being associated with one SSB among the received candidate SSBs.

According to a fourth aspect of the present disclosure, there is provided a method for establishing an initial access. The method comprises transmitting, from a base station, candidate synchronization signal/physical broadcast channel blocks (SSBs) in a synchronization signal (SS) burst set within one or more SSB channel occupancy time (SSB COT) to a terminal; and receiving, at the base station, a physical random access channel (PRACH) preamble on a PRACH occasion (RO) from the terminal, the RO being associated with one SSB among the transmitted candidate SSBs.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 1a shows a schematic example of base station for establishing an initial access in accordance with embodiments. In the example, the base station is referred to as a ngNodeB (gNB).

FIG. 1b shows a schematic example of terminal for establishing an initial access in accordance with embodiments. In the example, the terminal is referred to as a user equipment.

FIG. 3a shows a signal flow in accordance with an example of a method by which an initial access is established between a base station and a terminal in accordance with the present disclosure.

FIG. 3b shows a signal flow in accordance with another example of a method by which an initial access is established between a base station and a terminal in accordance with the present disclosure.

FIG. 4a shows an example of segmented synchronization signal/physical broadcast channel block (SSB) transmission between the base station and the terminal in a process of establishing an initial access between the base station and the terminal in accordance with embodiments as shown in at least one of FIGS. 1a, 1b and 2.

FIG. 4b shows another example of non-segmented SSB transmission between the base station and the terminal in a process of establishing an initial access between the base station and the terminal in accordance with embodiments as shown in at least one of FIGS. 1a, 1b and 2.

FIG. 5a shows an example of timing of SSB transmission in accordance with the segmented SSB transmission as shown in FIG. 4a.

FIG. 5b shows an example of timing of SSB transmission in accordance with the segmented SSB transmission as shown in FIG. 4a and the non-segmented SSB transmission as shown in FIG. 4b.

FIG. 6a shows an example of random access channel (RACH) procedure in a process of establishing an initial access between the base station and the terminal, wherein the process of establishing the initial access includes a segmented SSB transmission as shown in FIG. 4a. In this example, each SSB COT in the segmented SSB transmission forms a SSB COT group.

FIG. 6b shows another example of RACH procedure in a process of establishing an initial access between the base station and the terminal, wherein the process of establishing the initial access includes a segmented SSB transmission as shown in FIG. 4a. In this example, each SSB COT in the segmented SSB transmission forms a SSB COT group.

FIG. 8a shows an example of RACH procedure in a process of establishing an initial access between the base station and the terminal, wherein the process of establishing the initial access includes a non-segmented SSB transmission as shown in FIG. 4b.

FIG. 8b shows another example of RACH procedure in a process of establishing an initial access between the base station and the terminal, wherein the process of establishing the initial access includes a non-segmented SSB transmission as shown in FIG. 4b.

Figure 2:
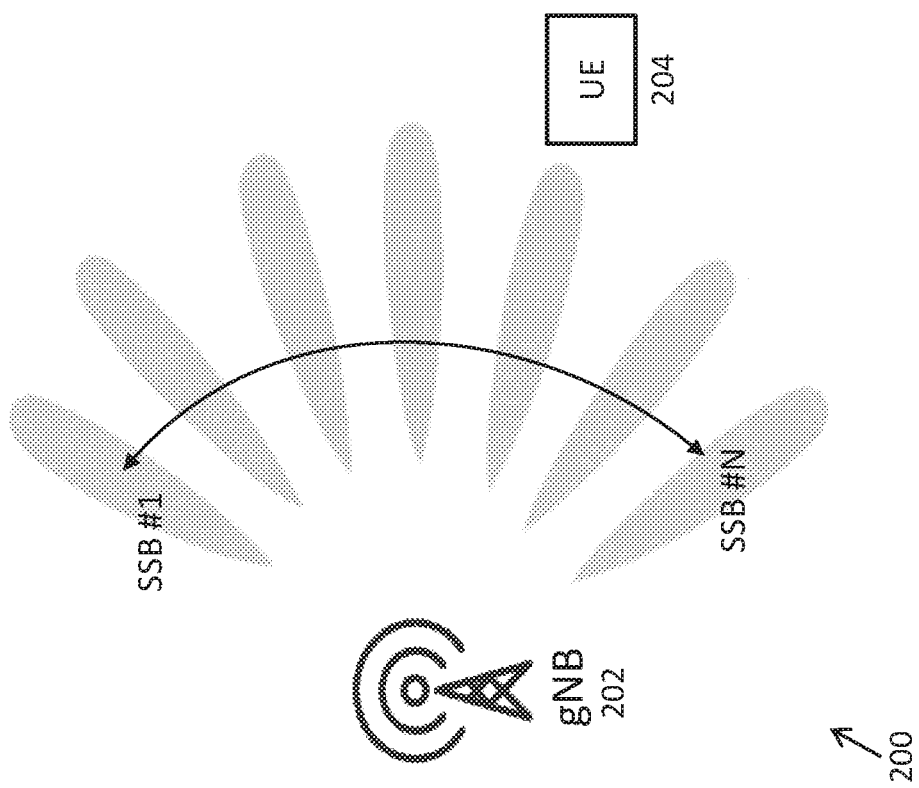
FIG. 2 shows a schematic diagram of a system having a base station and a terminal in accordance with embodiments, where an initial access may be established between the base station and the terminal.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to a base station and a terminal for establishing initial access in a 5G NR communication system. The 5G NR communication system may be a NR stand-alone system. A NR stand-alone system can operate in licensed bands, in unlicensed bands, or in both licensed bands and unlicensed bands. When a NR stand-alone system operates in both licensed bands and unlicensed bands, it may utilize NR licensed-assisted access (NR-LAA) to support DL and UL data transmission in unlicensed bands. In a NR stand-alone system operating in licensed bands or in both licensed bands and unlicensed bands, the initial access is established by communicating between the base station and the terminal in licensed bands. However, according to the present disclosure, in a NR stand-alone system operating in unlicensed bands, the initial access shall be established by communicating between the base station and the terminal in unlicensed bands. The establishment of the initial access may be in accordance with a LBT procedure at the base station. In a LBT procedure, the base station checks whether current channel is idle. If the current channel is idle, the base station may obtain a first synchronization signal/ physical broadcast channel block (SSB) channel occupancy time (COT) and transmit candidate SSBs within the first SSB COT. The base station may also determine a number of SSB COTs that are needed for transmitting candidate SSBs based on the duration of the first SSB COT. All of the candidate SSBs composes a synchronization signal (SS) burst set.

A terminal can be used for accessing various services and/or applications provided via a 5G NR communication system. In the 5G NR communication system, the access is provided via a NR access interface between communication devices and an appropriate access system. The terminal may access a communication system wirelessly via a base station. A base station can provide one or more cells of a cellular system.

FIG. 1a shows a schematic, partially sectioned view of a base station 100 that can be used for establishing an initial access with a terminal in accordance with the present disclosure. Likewise, FIG. 1b shows a schematic, partially sectioned view of a terminal 150 that can be used for establishing an initial access with the base station as shown in FIG. 1a, in accordance with the present disclosure.

Various functions and operations of the base station 100 and the terminal 150 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 1a, the base station 100 is typically provided with at least one radio transmitter 102, at least one radio receiver 104, at least one antenna 108 and at least one controller 106 for use in software and hardware aided execution of tasks it is designed to perform, including control of access to and communications with terminals such as the terminal 150 as shown in FIG. 1b. The data processing, storage and other relevant control apparatus can be provided on an appropriate circuit board and/or in chipsets. In various embodiments, when in operation, the at least one radio transmitter 102, at least one radio receiver 104 and at least one antenna 108 may be controlled by the at least one controller 106.

Similarly, as shown in FIG. 1b, the terminal 150 is typically provided with at least one radio receiver 154, at least one radio transmitter 152, at least one antenna 158 and at least one controller 156 for use in software and hardware aided execution of tasks it is designed to perform, including control of access to and communications via base stations such as the base station 100 as shown in FIG. 1a. The data processing, storage and other relevant control apparatus can be provided on an appropriate circuit board and/or in chipsets. In various embodiments, when in operation, the at least one radio transmitter 152, at least one radio receiver 154 and at least one antenna 158 may be controlled by the at least one controller 156.

The at least one radio transmitter 102, at least one radio receiver 104, and at least one controller 106 of the base station 100, and the at least one radio transmitter 152, at least one radio receiver 154, and at least one controller 156 of the terminal 150, when in operation, provide functions required for establishing an initial access between the terminal 150 and the base station 100 in accordance with embodiments of the present disclosure.

For example, the at least one radio transmitter 102 of the base station 100, when in operation, can be configured to transmit candidate synchronization signal/physical broadcast channel blocks (SSBs) in a synchronization signal (SS) burst set to the at least one radio receiver 154 of the terminal 150.

As exemplified in FIG. 4a (more details will be provided below), each candidate SSB includes primary and secondary synchronization signals (PSS, SSS) and physical broadcast channel (PBCH). Each PSS or SSS occupies 1 symbol and 127 subcarriers. The PBCH spans across 3 OFDM symbols and 240 subcarriers, but on one symbol leaving an unused part in the middle for the SSS. As defined in 3GPP TS 38.300 V15.2.0, the periodicity of the SSB (i.e. SS burst set period) can be configured by a 5G core network (5GC) in a 5G NR communication system. As defined in 3GPP TS 38.300 V15.2.0, the terminal 150 may assume a band-specific sub-carrier spacing for the SSB unless a network in the 5GC has configured the terminal 150 to assume a different sub-carrier spacing. In the present disclosure, since the base station 100 operates in unlicensed bands in the 5G NR communication system, the timing of when the SSB can be sent depends on a result of a LBT procedure carried out at the base station 100. As described above, in a LBT procedure, the base station 100 checks whether current channel is idle. If the current channel is idle, the base station 100 may obtain a first SSB channel occupancy time (COT) and transmit candidate SSBs within the first SSB COT. The base station 100 may also determine the number of SSB COTs that are needed for transmitting the candidate SSBs in a SS burst set based on the duration of the first SSB COT.

In a 5G NR communication system, the base station 100 may be configured to periodically transmit beams at different directions by the at least one radio transmitter 102 and at least one antenna 108 as shown in FIG. 1a. In some embodiments, the transmission of the beams is controlled by the at least one controller 106 of the base station 100. More information of the 5G NR communication system will be provided in FIG. 2. In accordance with various embodiments, the at least one radio transmitter 102 of the base station 100 may transmit candidate SSBs in a SS burst set to the at least one radio receiver 154 of the terminal 150 within one or more SSB channel occupancy time (SSB COT) via a beam sweeping procedure (as shown in FIG. 2). Each of the beams may be configured to transmit one of the candidate SSBs. The one or more SSB COT is obtained by the base station 100 using the LBT procedure. Each of the candidate SSBs may include information relating to a last SSB of the candidate SSBs. For example, in some embodiments, the PBCH included in each of the candidate SSBs carries an indication of the SSB index. The PBCH included in each of the candidate SSBs may carry an indication of the number of candidate SSBs to be transmitted in a current SSB COT, an indication of whether a current SSB COT is a first of the one or more SSB COT, an indication of whether a current SSB COT is a last of the one or more SSB COT, and an indication of whether a current SSB is a last SSB transmitted within a current SSB COT.

In some examples, the at least one controller 106 of the base station 100, when in operation, may be configured to control the transmission of the candidate SSBs at the at least one radio transmitter 102 of the base station 100 to the at least one radio receiver 154 of the terminal 150.

Similarly, in some examples, the at least one controller 156 of the terminal 150, when in operation, may be configured to analyze the candidate SSBs received from the base station 100 and to control uplink (UL) transmission in a 4-step random access channel (RACH) procedure or a 2-step RACH procedure to the at least one radio receiver 104 of the base station 100. Details of the 4-step RACH procedure and 2-step RACH procedure are described in the following paragraphs.

The at least one controller 106 of the base station 100, when in operation, is configured to determine the number of the one or more SSB COT for transmitting the candidate SSBs, i.e. whether to transmit the candidate SSBs within one SSB COT or within a plurality of SSB COTs.

In some embodiments, the number of the one or more SSB COT may be determined based on a result of the LBT procedure, as described above, carried out at the base station 100. For example, if the result of the LBT procedure indicates that a duration of a first of the one or more SSB COT is not less than that a duration required to transmit all the candidate SSBs in the SS burst set, the number of the one or more SSB COT is 1; otherwise the number of the one or more SSB COT is 2 or more.

In an example, if the number of the one or more SSB COT is 1, the at least one controller 106 of the base station 100 can determine to deploy non-segmented SSB transmission in the present initial access procedure, and send corresponding signals to the at least one radio transmitter 102 for transmitting the candidate SSBs to the at least one radio receiver 154 of the terminal 150 within one SSB COT. In this scenario, the at least one controller 106 of the base station 100 may configure the indication of a current SSB COT being a first and a last of the one or more SSB COT and the indication of the number of candidate SSBs to be transmitted in a current SSB COT being the total number of candidate SSBs in the SS burst set. The at least one controller 106 of the base station 100 indexes each of the candidate SSBs within the SS burst set. The at least one controller 156 of the terminal 150 may determine whether a received SSB is a last SSB of the candidate SSBs based on a comparison of a SSB index of the received SSB with the total number of the candidate SSBs in the SS burst set. For example, the at least one controller 156 may determine that there are twelve candidate SSBs in a SS burst set and a received SSB has a SSB index of 12. The received SSB may then be determined to be the last SSB.

In another example, if the number of the one or more SSB COT is two or more, the at least one controller 106 of the base station 100 can determine to deploy segmented SSB transmission in the present initial access procedure, and send corresponding signals to the at least one radio transmitter 102 for transmitting the candidate SSBs to the at least one radio receiver 154 of the terminal 150. For example, if the current channel is idle, the at least one controller 106 of the base station 100 may obtain a first SSB COT according to a LBT procedure. Having obtained the first SSB COT, the at least one controller 106 of the base station 100 may not be able to determine how many further SSB COTs are required for transmitting the remaining candidate SSBs in the SS burst set. This is because the number of further SSB COTs depends on results of following LBT procedures carried out by the base station 100, since the channel conditions may change depending on various factors, e.g. transmission from overlapping NR, LTE or Wi-Fi system, etc. In an embodiment, the at least one controller 106 of the base station 100 is configured to determine whether all the candidate SSBs in the SS burst set have been transmitted. That is, the at least one controller 106 is configured to determine whether any more SSB COT is required. The at least one controller 106 of the base station 100 is configured to provide information on whether a SSB COT is a last SSB COT in a SS burst set period. As described above, such information may be included in the PBCH of each of the candidate SSBs.

To ensure efficient use of PRACH occasion (RO) resources, during the segmented SSB transmission, the at least one controller 106 of the base station 100 can distribute the two or more SSB COTs into one or more SSB COT group for SSB transmission. Each SSB COT group is provided with one or more PRACH occasions (ROs) associated with each of the candidate SSBs transmitted within the SSB COT group. In other words, during the segmented SSB transmission, the at least one controller 106 of the base station 100 can determine to transmit the candidate SSBs in the SS burst set within one or more SSB COT group by the at least one transmitter 102, wherein each of the one or more SSB COT group may include one or more SSB COT.

In this manner, the at least one controller 106 of the base station 100 may determine a sufficient number of SSBs to be transmitted with a SSB COT group so that the at least one receiver 154 of the terminal 150 may receive a plurality of SSBs that are sufficient enough for the at least one controller 156 of the terminal 150 to select a best beam or a beam with a quality that is good enough. In this manner, the present disclosure advantageously avoids scenarios in which no beam transmitting SSBs in a SSB COT has a quality that is good enough for the terminal to use which will in turn waste PRACH occasions (ROs) associated with the SSBs for the at least one transmitter 152 of the terminal 150 to utilise for the RACH procedure. Advantageously, by distributing the two or more SSB COTs into one or more SSB COT group, the present disclosure ensures efficient usage of the ROs associated with the SSBs, which allows more efficient and reliable communications between the base station 100 and the terminal 150.

Details of the segmented SSB transmission in one or more SSB COT group are shown in FIGS. 6a, 6b, 7a and 7b. For example, each of the one or more SSB COT group has a duration during which a corresponding number of SSBs among the candidate SSBs are transmitted. In this scenario, the at least one controller 106 of the base station 100 indexes each of the corresponding number of SSBs within the SSB COT group. With each SSB being indexed and each SSB index being transmitted together with the respective SSB, the at least one controller 156 of the terminal 150 may determine whether a received SSB is the last SSB of the candidate SSBs in the SS burst set based on an indication whether the received SSB is a last SSB transmitted within the current SSB COT and an indication whether the current SSB COT is a last SSB COT in a SS burst set period. In some embodiments, the PBCH included in each of the candidate SSBs may carry an indication of whether a current SSB COT is a last SSB COT in a current SSB COT group. The at least one controller 156 of the terminal 150 may determine whether a received SSB is the last SSB of the candidate SSBs transmitted within a current SSB COT group based on an indication whether the received SSB is a last SSB transmitted within the current SSB COT and an indication whether the current SSB COT is a last SSB COT in the current SSB COT group.

Additionally, the at least one radio transmitter 102 of the base station 100, when in operation, may be configured to transmit physical random access channel (PRACH) configuration information to the at least one radio receiver 154 of the terminal 150. The PRACH configuration information may be, along with other cell configuration parameters, included in remaining minimum system information (RMSI) transmitted within the one or more SSB COT by the at least one radio transmitter 102 of the base station 100 to the at least one radio receiver 154 of the terminal 150.

When the at least one controller 156 of the terminal 150 identifies, within the one or more SSB COT, a best beam or a beam with a quality that is good enough, the at least one radio transmitter 152 of the terminal 150 may be configured by the at least one controller 156 to start a RACH procedure with the base station 100, using a RO associated with one of the candidate SSBs corresponding to the best beam or the beam with a quality that is good enough. A RO is a time-frequency resource on which the at least one radio transmitter 152 of the terminal 150 can transmit the PRACH preamble to the base station 100.

In the present disclosure, the at least one controller 156 of the terminal 150 may identify that a best beam among all the beams received from the base station 100 via different directions. The SSB transmitted through the best beam is associated with one or more RO that are most suitable for the terminal 150 to utilise.

In the present disclosure, the at least one controller 156 of the terminal 150 may apply a threshold for selecting a beam that is good enough. The threshold may be indicated by higher layer signalling. The higher layer signalling may be carried in the RMSI.

In the present disclosure, the RACH procedure may be a 4-step RACH procedure or a 2-step procedure that takes place after the transmission of the candidate SSBs from the at least one transmitter 102 of the base station 100 to the at least one radio receiver 154 of the terminal 150. An example of the 4-step RACH procedure is depicted as steps 310, 312, 314 and 316 in FIG. 3a. An example of the 2-step procedure is depicted as steps 360 and 362 in FIG. 3b.

In some examples, at a first step of a 4-step RACH procedure, the at least one radio receiver 104 of the base station 100 may be configured to receive a PRACH preamble on a RO from the at least one radio transmitter 152 of the terminal 150. As described above, a RO is a time-frequency resource on which the terminal 150 can transmit the PRACH preamble to the base station 100. The RO is associated with one SSB among the candidate SSBs transmitted from the base station 100.

In some examples where the candidate SSBs are transmitted within one or more SSB COT group in segmented SSB transmission, the at least one radio receiver 104 of the base station 100 may be configured to receive the PRACH preamble on the RO within the one or more SSB COT group from the at least one transmitter 152 of the terminal 150. Details of the segmented SSB transmission in one or more SSB COT group are shown in FIGS. 6*a*, 6*b*, 7*a* and 7*b*.

In various embodiments, the one or more RO associated with each of the candidate SSBs can be assigned by the at least one controller 106 of the base station 100. The one or more RO can be derivable by the at least one controller 156 of the terminal 150 based on the PRACH configuration information transmitted within the one or more SSB COT.

In various embodiments, the at least one controller 106 of the base station 100 may be configured to associate the one or more RO with each of the candidate SSBs based on one or more mapping rules. The one or more mapping rules are between a SSB index of the each of the candidate SSBs and the one or more RO associated with the each of the candidate SSBs. The SSB to RO association relationship (e.g. one SSB associated with one RO or one SSB associated with multiple ROs) may be indicated in the PRACH configuration information. Details of the one or more mapping rules between a SSB index of the each of the candidate SSBs and the one or more RO associated with the each of the candidate SSBs are shown in FIGS. 9*a*, 9*b*, 9*c*, 9*d* and 9*e* and described in the corresponding paragraphs.

In some examples, at a second step of the 4-step RACH procedure, the at least one radio transmitter 102 of the base station 100 may be further configured to transmit a Random Access (RA) response in response to the receipt of the PRACH preamble from the at least one radio transmitter 152 of the terminal 150. The RA response may include a UL grant to the terminal 150. In some examples, the RA response can be transmitted by the at least one radio transmitter 102 of the base station 100 to the at least one radio receiver 154 of the terminal 150 within the one or more SSB COT. In some other examples, the RA response can be transmitted by the at least one radio transmitter 102 of the base station 100 to the at least one radio receiver 154 of the terminal 150 after the one or more SSB COT.

In some examples, at a third step of the 4-step RACH procedure, the at least one radio receiver 104 of the base station 100 may be configured to receive a radio resource control (RRC) connection request message from the at least one radio transmitter 152 of the terminal 150 in response to a receipt of the RA response from the at least one radio transmitter 102 of the base station 100. In some examples, the RRC connection request message can be transmitted by the at least one radio transmitter 152 of the terminal 150 to the at least one radio receiver 104 of the base station 100 within the one or more SSB COT. In some other examples, the RRC connection request message can be transmitted by the at least one radio transmitter 152 of the terminal 150 to the at least one radio receiver 104 of the base station 100 after the one or more SSB COT.

In some examples, at a fourth step of the 4-step RACH procedure, the at least one radio transmitter 102 of the base station 100 may be configured to transmit a RRC connection setup message in response to a receipt of the RRC connection request message from the at least one transmitter 152 of the terminal 150. In some examples, the RRC connection setup message can be transmitted by the at least one radio transmitter 102 of the base station 100 to the at least one radio receiver 154 of the base station 150 within the one or more SSB COT. In some other examples, the RRC connection setup message can be transmitted by the at least one radio transmitter 102 of the base station 100 to the at least one radio receiver 154 of the base station 150 after the one or more SSB COT.

In an alternative embodiment, the above described 4-step RACH procedure may be implemented as a 2-step RACH procedure.

In some examples, at a first step of the 2-step RACH procedure, the at least one radio receiver 104 of the base station 100 may be configured to receive the RRC connection request message together with the PRACH preamble on the RO from the at least one transmitter 152 of the terminal 150. In some examples, the RRC connection request message together with the PRACH preamble can be transmitted by the at least one radio transmitter 152 of the terminal 150 to the at least one radio receiver 104 of the base station 100 within the one or more SSB COT. In some other examples, the RRC connection request message together with the PRACH preamble can be transmitted by the at least one radio transmitter 152 of the terminal 150 to the at least one radio receiver 104 of the base station 100 after the one or more SSB COT.

In some examples, at a second step of the 2-step RACH procedure, the at least one radio transmitter 102 of the base station 100 may be configured to transmit the RRC connection setup message together with the RA response to at least one radio receiver 154 of the terminal 150. In some examples, the RRC connection setup message together with the RA response can be transmitted by the at least one radio transmitter 102 of the base station 100 to the at least one radio receiver 154 of the base station 150 within the one or more SSB COT. In some other examples, the RRC connection setup message together with the RA response can be transmitted by the at least one radio transmitter 102 of the base station 100 to the at least one radio receiver 154 of the base station 150 after the one or more SSB COT.

It is appreciable by those skilled in the art that the 2-step RACH procedure utilized in the alternative embodiment advantageously provides an efficient and simplified procedure for establishing an initial access between the terminal 150 and the base station 100 since all message transfer of the 4-step RACH procedure still remains in the 2-step RACH procedure.

If the 4-step RACH procedure or the 2-step RACH procedure is successfully completed, the initial access between the terminal 150 and the base station 100 is established via the best beam or the beam with a quality that is good enough of the base station 100. Data transfer may then take place on this terminal-specific (dedicated) beam.

In the examples as described above, the at least one radio transmitter 102 of the base station 100 is configured to transmit the candidate SSBs with an interval between each of the candidate SSBs in a SSB COT to the at least one radio receiver 154 of the terminal 150. In some embodiments, the interval may be shorter than that between each of the candidate SSBs transmitted in another SSB COT of a longer duration. In some other embodiments, the interval may be longer than or the same as that between each of the candidate SSBs transmitted in another SSB COT of a longer duration. In some examples, the interval may be kept the same in any SSB COT. For example, the interval is zero (i.e., candidate SSBs are consecutively transmitted in a SSB COT).

In view of the examples as described above, if the present disclosure is used in a NR stand-alone system operating in licensed bands or in both licensed bands and unlicensed bands, the at least one radio transmitter 102 of the base station 100 may be configured to transmit the candidate SSBs in a new radio license-assisted access (NR LAA)

channel with an interval between each of the candidate SSBs. The interval may be shorter than that between each of the candidate SSBs transmitted in a new radio normal (NR-normal) channel. In some other embodiments, the interval may be longer than or the same as that between each of the candidate SSBs transmitted in a NR-normal channel.

FIG. 2 shows a schematic diagram of a 5G NR communication system 200 having a base station 202 and a terminal 204 in accordance with various embodiments of the present disclosure, where an initial access can be established between the base station 202 and the terminal 204.

As shown in FIG. 2, the base station 202 in the 5G NR communication system 200 may be referred to as a ngNodeB (gNB) 202. The base station 202 can be connected to a data network via an appropriate gateway. For the sake of simplicity, the data network and the gateway are not shown in the accompanying figures. In the 5G NR 3GPP specifications (e.g. 3GPP TS 38.300 V15.2.0), the gNB 202 is a node providing NR user plane and control plane protocol terminations towards the terminal 204 (which may be interchangeably referred to as a user equipment, i.e. UE), and connected via a new generation (NG) interface to the 5G core network (5GC, not shown in FIG. 2).

As described above with respect to FIGS. 1a and 1b, in the 5G NR communication system 200, the gNB 202 periodically transmits N SSBs through N beams, by the at least one radio transmitter 102 and at least one antenna 108 as shown in FIG. 1a. Such a procedure is known as beam sweeping, as shown in FIG. 2. For the terminal 204 to send and receive data, the terminal 204 first needs to connect to the gNB 202 by acquiring a beam via at least one antenna 158 and the at least one radio receiver 154 as shown in FIG. 1b. When the terminal 204 identifies a best beam or a beam with a quality that is good enough, the terminal 204 starts a RACH procedure to establish the initial access with the base station 100 via the identified beam. After the RACH procedure is successfully completed, the initial access between the terminal 204 and the gNB is established via the identified beam. Data transfer can then take place on the terminal-specific (dedicated) beam.

FIGS. 3a and 3b depict methods for establishing an initial access between a terminal 304 and a base station 302 in a 5G NR communication system, in accordance with two examples of the present disclosure. In the exemplified examples of FIGS. 3a and 3b, the base station 302 is a gNB 302. It can be appreciated by those skilled in the art that the base station 302 can also be a ng-eNB, which is a node providing Evolved Universal Mobile Telecommunications System (UMTS) Terrestrial Radio Access (E-UTRA) user plane and control plane protocol terminations towards the terminal, and connected via the NG interface to the 5GC.

As shown in FIG. 3a, an example 300 of the method comprises at least steps 306 and 310. At step 306, the base station 302 transmits candidate SSBs in a SS burst set within one or more SSB COT to the terminal 304. From the perspective of the terminal 304, at step 306, the terminal 304 receives candidate SSBs in a SS burst set from the base station 302. The candidate SSBs are transmitted from the base station 302 within one or more SSB COT in a SS burst set period.

The transmission of the candidate SSBs is further described with respect to FIGS. 4a, 4b, 5a, 5b, 6a, 6b, 7a, 7b, 8a and 8b. As described above with respect to FIG. 1a and FIG. 1b, the base station 302 may transmit the candidate SSBs by sweeping a plurality of beams (e.g. N beams as shown in FIG. 2). Each of the plurality of beams can be configured to transmit one of the candidate SSBs. By using beam sweeping to transmit the candidate SSBs, cell coverage of the base station 302 can be advantageously extended.

At step 310, the base station 302 receives a PRACH preamble (shown as Msg1) on a RO from the terminal 304. The RO is associated with one SSB among the transmitted candidate SSBs.

From the perspective of the terminal 304, at step 310, the terminal 304 transmits a PRACH preamble (shown as Msg1) on a RO to the base station 302. The RO is associated with one SSB among the received candidate SSBs.

Similar to FIG. 3a, an example 350 of the method shown in FIG. 3b comprises at least steps 356 and 360. At step 356, the base station 302 transmits candidate SSBs in a SS burst set within one or more SSB COT to the terminal 304. At step 360, the base station 302 receives a PRACH preamble (shown as Msg1) on a RO from the terminal 304. The RO is associated with one SSB among the transmitted candidate SSBs.

From the perspective of the terminal 304, at step 356, the terminal 304 receives candidate SSBs in a SS burst set from the base station 302. The candidate SSBs are transmitted from the base station 302 within one or more SSB COT. At step 360, the terminal 304 transmits a PRACH preamble (shown as Msg1) on a RO to the base station 302. The RO is associated with one SSB among the received candidate SSBs.

The examples 300, 350 of the method may include a step 308, 358. At step 308, 358, the base station 302 transmits PRACH configuration information in remaining minimum system information (RMSI) to the terminal 304. From the perspective of the terminal 304, at step 308, 358, the terminal 304 receives the PRACH configuration information in RMSI from the base station 302.

In some examples, the PRACH configuration information may be transmitted within the one or more SSB COT. In this scenario, the PRACH configuration information may be transmitted together with the candidate SSBs at step 306, 356 via a frequency division multiplexing or time division multiplexing manner. In this manner, the step 308, 358 may be included in step 306, 356.

The example 300 of the method may further include steps 312, 314 and 316. At step 312, the base station 302 may be further configured to transmit a RA response (shown as Msg2) in response to the receipt of the PRACH preamble from the terminal 304. Accordingly, from the perspective of the terminal 304, at step 312, the terminal 304 may be further configured to receive a RA response (shown as Msg2) in response to the transmission of the PRACH preamble to the base station 302.

In some examples, the RA response (shown as Msg2) can be transmitted by the base station 302 to the terminal 304 within the one or more SSB COT. In some other examples, the RA response (shown as Msg2) can be transmitted by the base station 302 to the terminal 304 after the one or more SSB COT.

At step 314, the base station 302 may be configured to receive a RRC connection request message (shown as Msg3) from the terminal 304 in response to a receipt of the RA response (shown as Msg2) from the base station 302.

In some examples, the RRC connection request message (shown as Msg3) can be transmitted by the terminal 304 to the base station 302 within the one or more SSB COT. In some other examples, the RRC connection request message (shown as Msg3) can be transmitted by the terminal 304 to the base station 302 after the one or more SSB COT.

At step 316, the base station 302 may be configured to transmit a RRC connection setup message (shown as Msg4)

in response to a receipt of the RRC connection request message (shown as Msg3) from the terminal 304.

In some examples, the RRC connection setup message (shown as Msg4) can be transmitted by the base station 302 to the terminal 304 within the one or more SSB COT. In some other examples, the RRC connection setup message (shown as Msg4) can be transmitted by the base station 302 to the terminal 304 after the one or more SSB COT.

In the example 350 of the method, at step 360, the base station 302 may be configured to receive a RRC connection request message (shown as Msg3) together with the PRACH preamble (shown as Msg1) on the RO from the terminal 304.

In some examples of step 360, the RRC connection request message (shown as Msg3) together with the PRACH preamble (shown as Msg1) can be transmitted by the terminal 304 to the base station 302 within the one or more SSB COT. In some other examples of step 360, the RRC connection request message (shown as Msg3) together with the PRACH preamble (shown as Msg1) can be transmitted by the terminal 304 to the base station 302 after the one or more SSB COT.

The example 350 of the method may further include step 362. At step 362, the base station 302 may be configured to transmit a RRC connection setup message (shown as Msg4) together with the RA response (shown as Msg2) to the terminal 304.

In some examples of step 362, the RRC connection setup message (shown as Msg4) together with the RA response (shown as Msg2) can be transmitted by the base station 302 to the terminal 304 within the one or more SSB COT. In some other examples of step 362, the RRC connection setup message (shown as Msg4) together with the RA response (shown as Msg2) can be transmitted by the base station 302 to the terminal 304 after the one or more SSB COT.

Steps 310, 312, 314 and 316 of the example 300 of the method form a 4-step RACH procedure, while step 360 and 362 of the example 350 of the method form a 2-step RACH procedure. It is appreciable by those skilled in the art that the 2-step RACH procedure utilized in the example 350 of the method advantageously provides an efficient and simplified procedure for establishing an initial access between the terminal 304 and the base station 302 since all message transfer of the 4-step RACH procedure still remains in the 2-step RACH procedure.

FIG. 4a shows an example of segmented SSB transmission between the base station and the terminal. FIG. 4b shows an example of non-segmented SSB transmission between the base station and the terminal.

In the example of segmented SSB transmission shown in FIG. 4a, the candidate SSBs in an SS burst set are transmitted within two or more SSB COTs. As exemplified by the candidate SSB 402, each of the candidate SSBs includes PSS, SSS and PBCH. Each PSS or SSS occupies 1 symbol and 127 subcarriers. The PBCH spans across 3 OFDM symbols and 240 subcarriers, but on one symbol leaving an unused part in the middle for the SSS. The periodicity of the SSB can be configured by the 5GC. As defined in 3GPP TS 38.300 V15.2.0, the terminal 304 may assume a band-specific sub-carrier spacing for the SSB unless a network in the 5GC has configured the terminal 304 to assume a different sub-carrier spacing.

For the sake of simplicity, in the example of segmented SSB transmission shown in FIG. 4a, there are 12 candidate SSBs 402, 404, 406, 408, 410, 412, 414, 416, 418, 420, 422 and 424 transmitted in three SSB COTs. In some examples, the 12 candidate SSBs may be evenly distributed in the three SSB COTs. Alternatively, as shown in FIG. 4a, the number of candidate SSBs within each of the three SSB COTs may be different depending on a duration of the respective SSB COT. In the example shown in FIG. 4a, SSB COT 2 has a duration longer than that of SSB COT 3, which in turn has a duration longer than that of SSB COT 1. Therefore, the SSB COT 2 includes more candidate SSBs (i.e. candidate SSBs 408, 410, 412, 414, and 416) compared to that of SSB COT 3 (which includes candidate SSBs 418, 420, 422 and 424), which in turn includes more candidate SSBs than that of SSB COT 1 (which includes candidate SSBs 402, 404 and 406).

In some embodiments of the segmented SSB transmission, the two or more SSB COTs may be distributed into one or more SSB COT group. Each SSB COT group may comprise one or more SSB COTs. Examples of the one or more SSB COT group are depicted in FIGS. 6a, 6b, 7a and 7b.

In some embodiments of the segmented SSB transmission, each of the candidate SSBs is assigned with a SSB index that is indexed within the corresponding SSB COT group. For example, if SSB COT 1, SSB COT 2 and SSB COT 3 in FIG. 4a are distributed into three SSB COT groups as shown in FIGS. 6a and 6b, i.e. SSB COT group 1, SSB COT group 2 and SSB COT group 3, the three candidate SSBs 402, 404 and 406 transmitted in SSB COT 1 can be respectively assigned with SSB index (i.e. SSBI) 0, 1 or 2 within SSB COT group 1. The five candidate SSBs 408, 410, 412, 414, and 416 transmitted in SSB COT 2 can be respectively assigned with SSB index (i.e. SSBI) 0, 1, 2 or 3 within SSB COT group 2. Likewise, the four candidate SSBs 418, 420, 422, and 424 transmitted in SSB COT 3 can be respectively assigned with SSB index (i.e. SSBI) 0, 1, 2 or 3 within SSB COT group 3.

In some embodiments, the segmented SSB transmission can be carried out if a SSB COT obtained by the base station according to the LBT procedure cannot support a total number of candidate SSBs in a SS burst set.

For example, if a first SSB COT obtained by the base station is less than the duration required to transmit all the candidate SSBs, segmented SSB transmission is needed. The candidate SSBs in the SS burst set will then be transmitted in two or more SSB COTs.

On the other hand, if a first SSB COT obtained by the base station is not less than a duration required to transmit all the candidate SSBs, no segmentation is needed. All of the candidate SSBs can be transmitted within one SSB COT.

FIG. 4b shows an example of non-segmented SSB transmission. As described above, in a non-segmented SSB transmission, the candidate SSBs in a SS burst set are transmitted within a single SSB COT.

In some embodiments of non-segmented SSB transmission, each of the candidate SSBs is indexed per SS burst set. As shown in FIG. 4b, the SS burst set includes twelve candidate SSBs 452, 454, 456, 458, 460, 462, 464, 466, 468, 470, 472 and 474 being transmitted within a single SSB COT. Each of the twelve candidate SSBs is respectively assigned with a SSB index (i.e. SSBI) 0, 1, 2, 3, 4, 5, 6, 7, 8, 9, 10, or 11.

In some embodiments of non-segmented SSB transmission, each of the candidate SSBs in an SS burst set is identified by its SSB index. In the example shown in FIG. 4b, each of the twelve candidate SSBs in the SS burst set is identified by its SSB index SSB 0, SSB 1, SSB 2, SSB 3, SSB 4, SSB 5, SSB 6, SSB 7, SSB 8, SSB 9, SSB 10 or SSB 11.

As described above, the non-segmented SSB transmission is carried out when the total number of candidate SSBs in a SS burst set is less than or equal to the number of SSBs supportable by a SSB COT.

FIG. 5a depicts an example of timing of SSB transmission in accordance with the segmented SSB transmission as shown in FIG. 4a.

In some embodiments, the base station attempts to obtain SSB COTs according to a LBT procedure subject to timing constraints. As shown in FIG. 5a, at every target SSB transmission time, the base station attempts to obtain a first SSB COT according to a LBT procedure for SSB transmission. The terminal can determine whether a received SSB is a first SSB based on the SSB index of the received SSB and the indication whether a current SSB COT is a first SSB COT. The terminal can further determine the next target SSB transmission time according to the timing of the first SSB and a SS burst set period, which can be predetermined by the 5G NR communication system or configurable by the base station. In the example shown in FIG. 5a, the SS burst set period is 20 ms. The SS burst set period may vary according to practical requirements.

As shown in FIG. 5a, a time interval between two consecutive SSB COTs, such as between SSB COT 1 and SSB COT 2 or between SSB COT 2 and SSB COT 3, is referred to as an inter-COT time interval. The inter-COT time interval can be predetermined by the 5G NR communication system or configurable by the base station. At a $i^{th}$ inter-COT time interval following a target SSB transmission time, the base station attempts to obtain a $(i+1)^{th}$ SSB COT according to a LBT procedure, wherein i=1, 2, . . . , $N_{COT}$−1 where $N_{COT}$ is the number of SSB COTs.

In some embodiments, the inter-COT time interval may be indicated by higher layer signalling. The higher layer signalling may be carried in the RMSI.

As shown in FIG. 5a, in each of the two or more SSB COTs, the transmitted SSBs are separated by a time interval between each of the candidate SSBs in the corresponding SSB COT. The time interval is referred to as an inter-SSB time interval. In each of the two or more SSB COTs, the first SSB is transmitted at the beginning of each SSB COT. In some examples, the inter-SSB time interval can be predetermined. For example, the inter-SSB time interval can be 0, which means the candidate SSBs are consecutively transmitted within each SSB COT without intervals.

As described above, in the segmented SSB transmission, two or more SSB COTs may be distributed into one or more SSB COT group. Each SSB COT group may comprise one or more SSB COTs. Detailed information of the one or more SSB COT group is provided with respect to FIGS. 6a, 6b, 7a and 7b.

In different SS burst set periods, the number of SSB COTs obtained with LBT may be different. As shown in FIG. 5a, since the channel conditions may change according to various factors, after transmitting a first SS burst set within three SSB COTs, the base station may determine, at a next target SSB transmission time, new SSB transmission arrangement for a next SS burst set. For example, at a second target SSB transmission time as shown in FIG. 5a, the base station may obtain a first SSB COT according to a LBT procedure for transmitting a second SS burst set, and may determine that the first SSB COT has a duration that is less than that required for transmitting all the candidate SSBs in the second SSB COT. In response to this determination, the base station may, upon an inter-COT time interval after the second target SSB transmission time, obtain a second SSB COT. If the second SSB COT has a duration that is less than that required for transmitting the remaining candidate SSBs in the second SS burst set, more SSB COTs will need to be obtained. On the other hand, if the second SSB COT has a duration that is longer than or equal to that required for transmitting the remaining candidate SSBs in the second SS burst set, the base station may determine that two SSB COTs are sufficient for transmitting the candidate SSBs in the second SS burst set, and may indicate the information of two SSB COTs in the candidate SSBs that are transmitted within the second SSB COT. In this manner, the terminal may be able to determine, when receiving the candidate SSBs within the second COT, that the second SSB COT is the last SSB COT for the second SS burst. Such a scenario is depicted in FIG. 5a.

FIG. 5b depicts an example of timing of SSB transmission in accordance with the segmented SSB transmission as shown in FIG. 4a and the non-segmented SSB transmission as shown in FIG. 4b.

As shown in FIG. 5b, in the non-segmented SSB transmission, all the candidate SSBs are transmitted within a single SSB COT. At every target SSB transmission time, the base station attempts to obtain a SSB COT according to a LBT procedure for SSB transmission. The terminal can determine whether a received SSB is a first SSB based on the SSB index of the received SSB. The terminal can further determine the next target SSB transmission time according to the timing of the first SSB and a SS burst set period, which can be predetermined by the 5G NR communication system or configurable by the base station. In the example shown in FIG. 5b, the SS burst set period is 20 ms.

As shown in FIG. 5b, in the SSB COT, the transmitted SSBs are separated by a time interval between each of the candidate SSBs in the SSB COT. The time interval is referred to as an inter-SSB time interval. In non-segmented SSB transmission, the first SSB is transmitted at the beginning of the SSB COT. In some examples, the inter-SSB time interval can be predetermined. For example, the inter-SSB time interval can be 0, which means the candidate SSBs are consecutively transmitted within each SSB COT without intervals.

In different SS burst set periods, the number of SSB COTs obtained with LBT may be different. As shown in FIG. 5b, since the channel conditions may change according to various factors, after transmitting a first SS burst set within one SSB COT, the base station may determine at a next target SSB transmission time that the channel conditions are now not suitable for non-segmented SSB transmission. For example, at a second target SSB transmission time as shown in FIG. 5b, the base station may obtain a first SSB COT for transmitting a second SS burst set according to a LBT procedure and determines that segmented SSB transmission is needed since the first SSB COT has a duration less than that required for transmitting all the candidate SSBs of the second SS burst set. In response to this determination, the base station may, upon an inter-COT time interval after the second target SSB transmission time, obtain a second SSB COT. If the second SSB COT has a duration that is less than that required for transmitting the remaining candidate SSBs in the second SS burst set, more SSB COTs will need to be obtained. On the other hand, if the second SSB COT has a duration that is longer than or equal to that required for transmitting the remaining candidate SSBs in the second SS burst set, the base station may determine that two SSB COTs are sufficient for transmitting the candidate SSBs in the second SS burst set, and may indicate the information of two SSB COTs in the candidate SSBs that are transmitted within the second SSB COT. In this manner, the terminal may be able to determine, when receiving the candidate SSBs within the second COT, that the second SSB COT is the last SSB COT for the second SS burst. Such a scenario is depicted in FIG. 5b.

In the examples shown in FIGS. 5a and 5b, the terminal does not need to be prepared for receiving SSBs during the separation between any two SSB COTs. In this manner, power consumption may be advantageously reduced.

FIGS. 6a and 6b each depicts an example of random access channel (RACH) procedure in accordance with the segmented SSB transmission as shown in FIGS. 4a and 5a. In the examples, each SSB COT in the segmented SSB transmission forms a SSB COT group.

As shown in the examples of FIG. 6a and FIG. 6b, twelve candidate SSBs in a SS burst set are transmitted within three SSB COTs, i.e. SSB COT 1, SSB COT 2 and SSB COT 3. The three SSB COTs are distributed into three SSB COT groups, i.e. SSB COT group 1, SSB COT group 2, and SSB COT group 3, respectively. It is appreciable that, there may be a different number of candidate SSBs (e.g. 4, 8, or 64 candidate SSBs) to be transmitted in the SS burst set depending on carrier frequency.

In the example of FIG. 6a, RACH procedures may take place at the terminal for transmitting PRACH preamble to the base station on twelve ROs corresponding to the twelve candidate SSBs transmitted in SSB COT group 1, SSB COT group 2 and SSB COT group 3. The ROs can be configured by the base station in three RA COTs, i.e. RA COT 1, RA COT 2, and RA COT 3, respectively corresponding to the three SSB COT groups. The RA COT 1, RA COT 2 and RA COT 3 are not included in the respective SSB COT group. In this manner, the PRACH preamble is not transmitted within the SSB COTs.

In the above example of FIG. 6a, PRACH configuration information containing PRACH resource (e.g. PRACH preamble/RO) comprised with other cell configuration parameters in RMSI can be transmitted within each SSB COT group, so that the terminal can obtain PRACH configuration information prior to the RACH procedures, e.g. the PRACH preamble transmissions.

On the other hand, in the example of FIG. 6b, RACH procedures may take place at the terminal for transmitting PRACH preamble to the base station on twelve ROs corresponding to the twelve candidate SSBs transmitted in SSB COT group 1, SSB COT group 2 and SSB COT group 3. The twelve ROs can be configured by the base station within SSB COT group 1, SSB COT group 2, and SSB COT group 3, respectively. Advantageously, in this manner, the PRACH preamble can be transmitted within the SSB COTs, which allows two transmission directions, i.e. both downlink communications and uplink communications and enhances efficiency and throughput of the 5G NR communications.

In the above example of FIG. 6b, PRACH configuration information containing PRACH resource (e.g. PRACH preamble/RO) comprised with other cell configuration parameters in RMSI can be transmitted within each SSB COT group in such a manner that the terminal can obtain PRACH configuration information prior to the RACH procedures, e.g. the PRACH preamble transmissions.

Figure 7A:
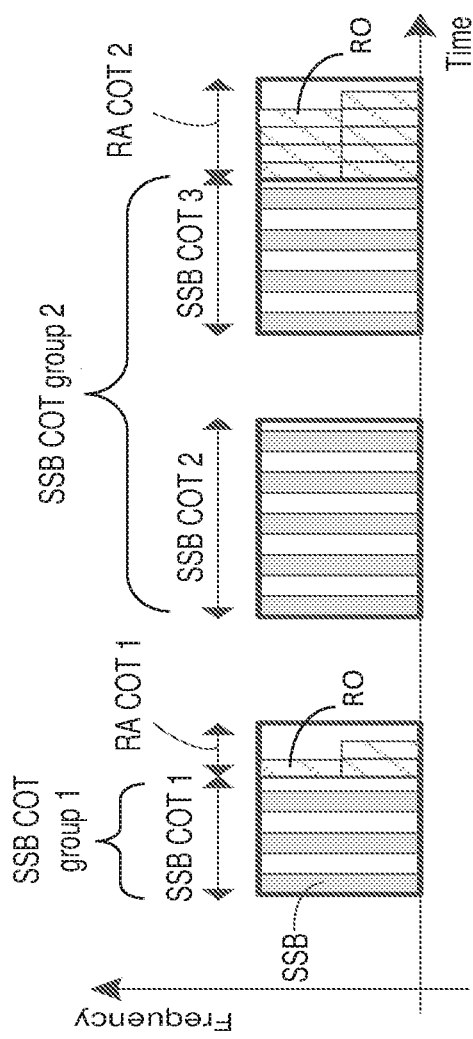
FIG. 7a shows yet another example of RACH procedure in a process of establishing an initial access between the base station and the terminal, wherein the process of establishing the initial access includes a segmented SSB transmission as shown in FIG. 4a. In this example, SSB COTs in the segmented SSB transmission is distributed into two SSB COT groups.
Figure 7B:
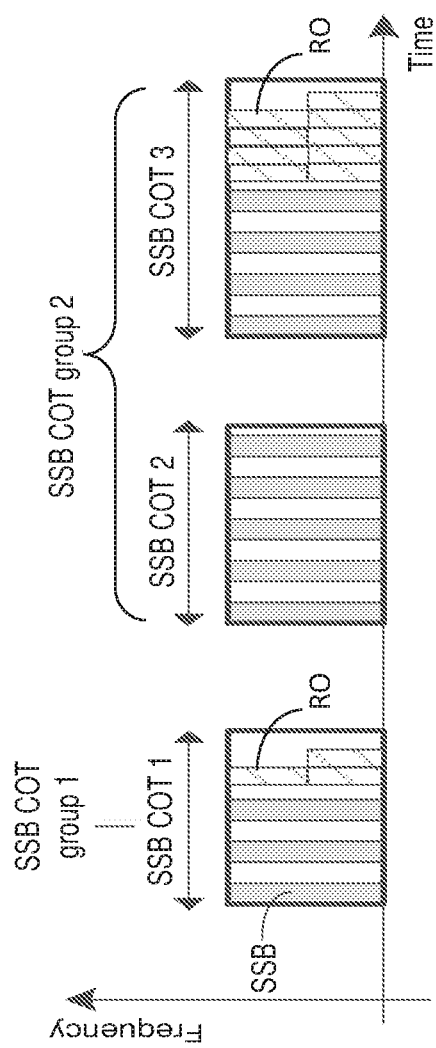
FIG. 7b shows yet another example of RACH procedure in a process of establishing an initial access between the base station and the terminal, wherein the process of establishing the initial access includes a segmented SSB transmission as shown in FIG. 4a. In this example, SSB COTs in the segmented SSB transmission are distributed into two SSB COT groups.

FIGS. 7a and 7b each depicts an example of random access channel (RACH) procedure in accordance with the segmented SSB transmission as shown in FIGS. 4a and 5a. In the examples, two or more SSB COTs can be distributed into one or more SSB COT group. As shown in FIGS. 7a and 7b, different SSB COT groups may have different number of SSB COTs.

As shown in the example of FIG. 7a and FIG. 7b, twelve candidate SSBs in a SS burst set are transmitted within three SSB COTs, i.e. SSB COT 1, SSB COT 2, and SSB COT 3. It is appreciable that there may be a different number of candidate SSBs (e.g. 4, 8, or 64 candidate SSBs) to be transmitted in the SS burst set depending on carrier frequency. In the present examples, the three SSB COTs are distributed into two SSB COT groups, i.e. SSB COT group 1 and SSB COT group 2.

In the example of FIG. 7a, RACH procedures may take place at the terminal for transmitting PRACH preamble to the base station on twelve ROs corresponding to twelve SSBs transmitted in the two SSB COT groups. The twelve ROs can be configured by the base station in two RA COTs corresponding to the two SSB COT groups. The RA COT is not included in the SSB COT group. In this manner, the PRACH preamble is not transmitted within the SSB COTs.

In some other examples, although not shown in FIG. 7a, the three SSB COTs may be aggregated into one SSB COT group. In this scenario, RACH procedures may take place at the terminal for transmitting PRACH preamble to the base station on twelve ROs corresponding to twelve SSBs transmitted in the one SSB COT group. The twelve ROs can be configured by the base station in one RA COT. The RA COT is not included in the SSB COT group. In this manner, the PRACH preamble is not transmitted within the SSB COTs.

In the above example of FIG. 7a where the three SSB COTs may be distributed into two SSB COT groups and the other examples where the three SSB COTs may be aggregated into one SSB COT group, PRACH configuration information containing PRACH resource (e.g. PRACH preamble/RO) comprised with other cell configuration parameters in RMSI can be transmitted within the SSB COT group so that the terminal can obtain PRACH configuration information prior to the RACH procedures, e.g. the PRACH preamble transmissions.

On the other hand, in the example of FIG. 7b, RACH procedures may take place at the terminal for transmitting PRACH preamble to the base station on twelve ROs corresponding to twelve SSBs transmitted in the two SSB COT groups. The twelve ROs can be configured by the base station within the SSB COT group. In this manner, the PRACH preamble is transmitted within the SSB COTs.

In some other examples, although not shown in FIG. 7b, the three SSB COTs may be aggregated into one SSB COT group. In this scenario, RACH procedures may take place at the terminal for transmitting PRACH preamble to the base station on twelve ROs corresponding to twelve SSBs transmitted in the one SSB COT group. The twelve ROs can be configured by the base station within the SSB COT group. In this manner, the PRACH preamble is transmitted within the SSB COTs.

In the above example of FIG. 7b, PRACH configuration information containing PRACH resource (e.g. PRACH preamble/RO) comprised with other cell configuration parameters in RMSI can be transmitted within the SSB COT group in such a manner that the terminal can obtain PRACH configuration information prior to the RACH procedures, e.g. the PRACH preamble transmissions.

In the above examples of FIGS. 6a, 6b, 7a and 7b and the other examples described above where the three SSB COTs are aggregated into one SSB COT group, the number of ROs that the terminal uses to transmit the PRACH preamble to the base station may be the same as the number of SSBs transmitted in a SS burst set. It is however appreciable that the number of ROs may be modified according to practical needs.

In addition, in the present disclosure, each of the candidate SSBs transmitted in the SS burst set may be associated with one or more RO. The SSB to RO association relationship can be predetermined or configurable by the base station. Details of the SSB to RO association relationship, or interchangeably referred to as SSB to RO mapping rule, are provided with respect to FIGS. 9a, 9b, 9c, 9d and 9e.

In some embodiments of the above examples of FIGS. 6a, 6b, 7a and 7b, RMSI configuration information may be carried in the PBCH included in each of the candidate SSBs, which informs the terminal how to receive the RMSI in each SSB COT group.

As described above in the examples of FIGS. 6a, 6b, 7a and 7b and the other examples described above (where the three SSB COTs are aggregated into one SSB COT group), according to the present disclosure, during segmented SSB transmission, the base station can distribute SSB COTs into one or more SSB COT group and provide each SSB COT group with one or more ROs associated with the candidate SSBs in the corresponding SSB COT group. As such, the base station may determine a sufficient number of SSBs to be transmitted into a SSB COT group so that the terminal can receive a pool of SSBs that is big enough for the terminal to select a best beam or a beam with a quality that is good enough from. In this manner, the present disclosure advantageously avoids scenarios in which no beam transmitting SSBs in a SSB COT has a quality that is good enough for the terminal to use which will in turn waste the ROs that have been assigned to the SSBs. Advantageously, by distributing the two or more SSB COTs into one or more SSB COT group, the present disclosure ensures efficient usage of the ROs associated with the SSBs, which allows more efficient and reliable communications between the base station and the terminal.

In addition, the above PRACH preamble transmissions in the examples of FIGS. 6a, 6b, 7a and 7b are advantageous. This is because if the terminal detects a beam with a quality which is good enough within an SSB COT group, the terminal can start a RACH procedure in the RA COT following the SSB COT group or within the SSB COT group. It does not need to wait until all candidate SSBs in a SS burst set are received to start the RACH procedure.

Further, the transmission of the PRACH preamble within the one or more SSB COT group as shown in FIGS. 6b and 7b advantageously allows two transmission directions, i.e. both downlink communications and uplink communications. Hence, the transmission of the PRACH preamble within the one or more SSB COT group further enhances efficiency and throughput of the 5G NR communications.

FIGS. 8a and 8b each shows an example of RACH procedure in accordance with the non-segmented SSB transmission as shown in FIG. 4b.

As shown in the examples of FIG. 8a and FIG. 8b, candidate SSBs in a SS burst set are transmitted within one SSB COT. In the example of FIG. 8a, ROs corresponding to SSBs transmitted in the SSB COT can be assigned by the base station in a RA COT. The RA COT is not included in the SSB COT. In this manner, the PRACH preamble is not transmitted within the SSB COT.

In the above example of FIG. 8a, PRACH configuration information containing PRACH resource (e.g. PRACH preamble/RO) comprised with other cell configuration parameters in RMSI can be transmitted within the SSB COT group so that the terminal can obtain PRACH configuration information prior to PRACH preamble transmission.

On the other hand, in the example of FIG. 8b, ROs corresponding to SSBs transmitted in the SSB COT can be assigned by the base station within the SSB COT. In this manner, the PRACH preamble is transmitted within the SSB COT.

In the above example of FIG. 8b, PRACH configuration information containing PRACH resource (e.g. PRACH preamble/RO) comprised with other cell configuration parameters in RMSI can be transmitted within the SSB COT in such a manner that the terminal can obtain PRACH configuration information prior to PRACH preamble transmission.

In some embodiments of the above examples of FIGS. 8a and 8b, RMSI configuration information may be carried in the PBCH included in each of the candidate SSBs.

FIGS. 9a, 9b, 9c, 9d and 9e each shows a SSB to RO mapping rule.

In the examples shown in FIGS. 6a, 6b, 7a, 7b, 8a and 8b, ROs assigned by the base station within an SSB COT group or in a RA COT correspond to one or more SSB to RO association period.

An example of a SSB to RO association period is shown in FIGS. 9a, 9b, 9c, 9d and 9e. The example of a SSB to RO association period comprises one or more PRACH slot. Within each PRACH slot, ROs may be frequency division multiplexed and/or time division multiplexed.

In some embodiments of the present disclosure, one SSB may be associated with more than one ROs. Such an association relationship is advantageous in cases where a large number of terminals identify the same best beam or the same beam that is good enough of a base station. With one SSB being associated with more than one ROs, each terminal may randomly select one of the more than one ROs associated with the same SSB for PRACH transmission, which may advantageously reduce the probability of collision.

It can be appreciable to those skilled in the art that, in some other embodiments, one SSB may be associated with one RO.

In the examples shown in FIGS. 9a, 9b, 9c, 9d and 9e, ROs are at least time division multiplexed in a PRACH slot and/or distributed across PRACH slots within a SSB to RO association period. For example, in some embodiments, the indexes of a first part of the PRACH slot may be repeated in a later part of the PRACH slot. In this manner, even if a terminal encounters a LBT failure in frequency division multiplexed ROs in a PRACH slot, the terminal may still be able to find PRACH transmission opportunities corresponding to a SSB which is associated to the frequency division multiplexed ROs.

Figure 9A:
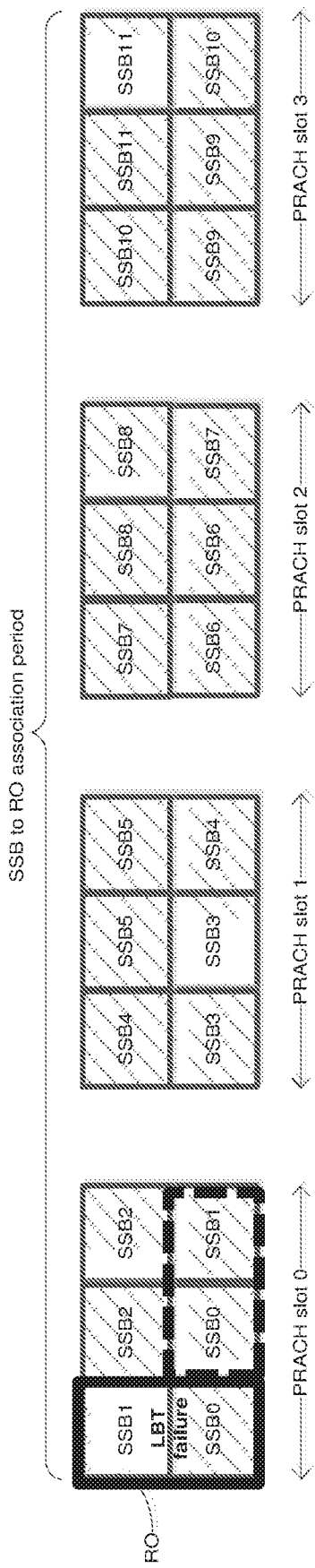
FIGS. 9a, 9b, 9c, 9d and 9e each shows a SSB to physical random access channel occasion (RO) mapping rule.

FIG. 9a depicts a first SSB to RO mapping rule. In the example shown in FIG. 9a, twelve SSBs are exemplified to explain the first SSB to RO mapping rule. The twelve SSBs may correspond to the twelve SSBs as shown in the examples of FIGS. 4a, 4b, 5a, 5b, 6a, 6b, 7a, 7b, 8a, and 8b. In this SSB to RO mapping rule, one SSB may be associated with more than one ROs. SSB indexes may be mapped to ROs in the following order:

1) in an increasing order of time resource indexes for time division multiplexed ROs within a PRACH slot;
2) in an increasing order of frequency resource indexes for frequency division multiplexed ROs; and
3) in an increasing order of indexes for PRACH slots.

By virtue of the first SSB to RO mapping rule, even if the terminal encounters a LBT failure in frequency division multiplexed ROs in the first PRACH slot, the terminal may still be able to find PRACH transmission opportunities corresponding to SSB0 and SSB1 in the time division multiplexed ROs.

Figure 9B:
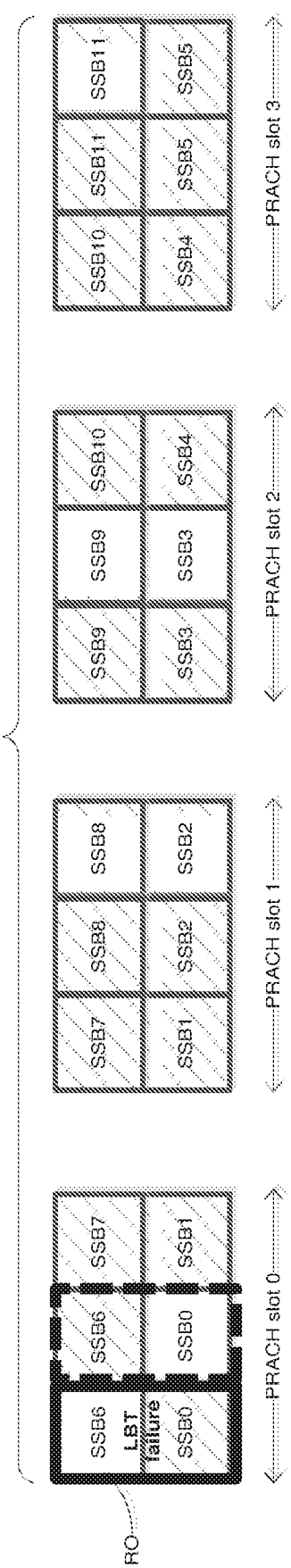

FIG. 9b depicts a second SSB to RO mapping rule. In the example shown in FIG. 9b, twelve SSBs are exemplified to explain the second SSB to RO mapping rule. The twelve SSBs may correspond to the twelve SSBs as shown in the examples of FIGS. 4a, 4b, 5a, 5b, 6a, 6b, 7a, 7b, 8a, and 8b. In this SSB to RO mapping rule, one SSB may be associated with more than one ROs. SSB indexes may be mapped to ROs in the following order:
1) in an increasing order of time resource indexes for time division multiplexed ROs within a PRACH slot;
2) in an increasing order of indexes for PRACH slots; and
3) in an increasing order of frequency resource indexes for frequency division multiplexed ROs.

By virtue of the second SSB to RO mapping rule, even if the terminal encounters a LBT failure in frequency division multiplexed ROs in the first PRACH slot, the terminal may still be able to find PRACH transmission opportunities corresponding to SSB0 and SSB6 in the frequency division multiplexed ROs.

Figure 9C:
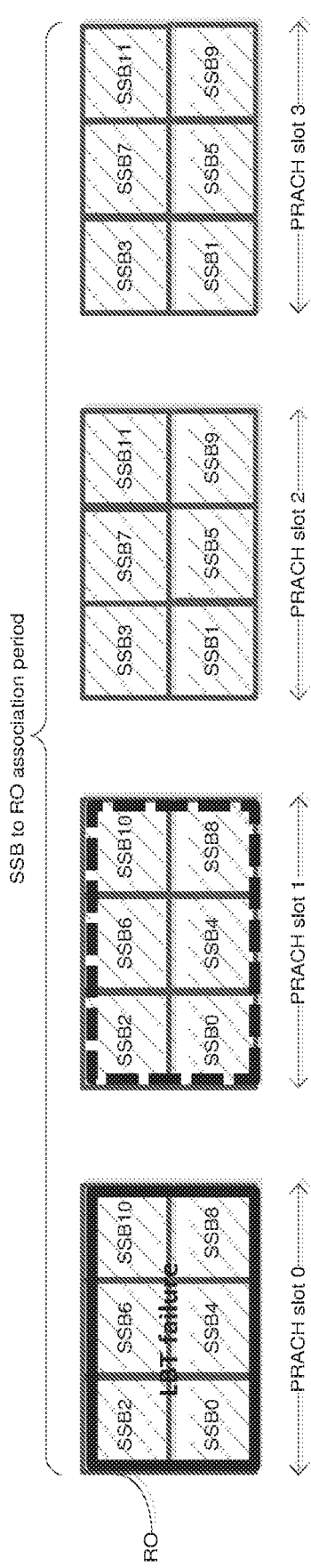

FIG. 9c depicts a third SSB to RO mapping rule. In the example shown in FIG. 9c, twelve SSBs are exemplified to explain the third SSB to RO mapping rule. The twelve SSBs may correspond to the twelve SSBs as shown in the examples of FIGS. 4a, 4b, 5a, 5b, 6a, 6b, 7a, 7b, 8a, and 8b. In this SSB to RO mapping rule, one SSB may be associated with more than one ROs. SSB indexes may be mapped to ROs in the following order:
1) in an increasing order of indexes for PRACH slots;
2) in an increasing order of frequency resource indexes for frequency division multiplexed ROs; and
3) in an increasing order of time resource indexes for time division multiplexed ROs.

By virtue of the third SSB to RO mapping rule, even if the terminal encounters a LBT failure in a PRACH slot, compared with the first and second mapping rules, the third SSB to RO mapping rule may have better chance to find PRACH transmission opportunities corresponding to the SSB which is mapped to the PRACH slot in other PRACH slots.

Figure 9D:
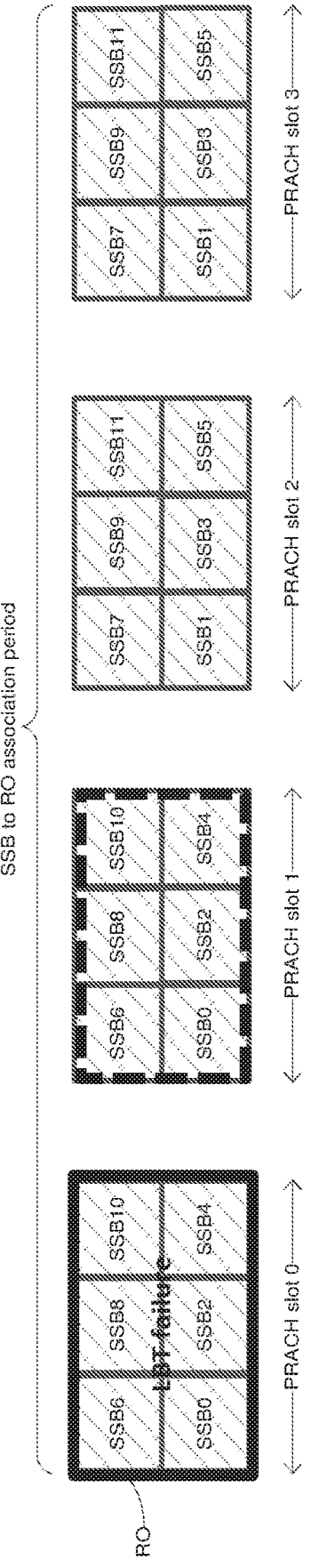

FIG. 9d depicts a fourth SSB to RO mapping rule. In the example shown in FIG. 9c, twelve SSBs are exemplified to explain the fourth SSB to RO mapping rule. The twelve SSBs may correspond to the twelve SSBs as shown in the examples of FIGS. 4a, 4b, 5a, 5b, 6a, 6b, 7a, 7b, 8a, and 8b. In this SSB to RO mapping rule, one SSB may be associated with more than one ROs. SSB indexes may be mapped to ROs in the following order:
1) in an increasing order of indexes for PRACH slots;
2) in an increasing order of time resource indexes for time division multiplexed ROs; and
3) in an increasing order of frequency resource indexes for frequency division multiplexed ROs.

By virtue of the fourth SSB to RO mapping rule, even if the terminal encounters a LBT failure in a PRACH slot, compared with the first and second mapping rules, the fourth SSB to RO mapping rule may have better chance to find PRACH transmission opportunities corresponding to the SSB which is mapped to the PRACH slot in other PRACH slots.

Figure 9E:
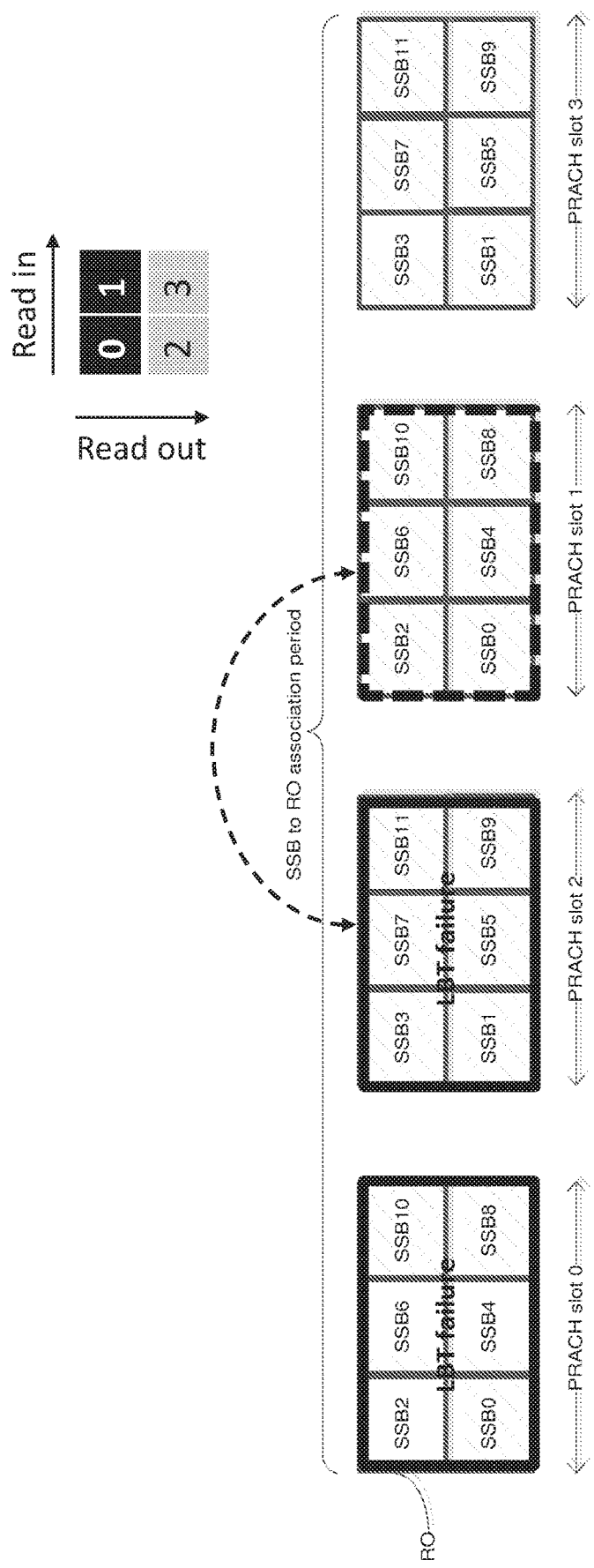

FIG. 9e depicts a fifth SSB to RO mapping rule. In the example shown in FIG. 9e, twelve SSBs are exemplified to explain the fifth SSB to RO mapping rule. The twelve SSBs may correspond to the twelve SSBs as shown in the examples of FIGS. 4a, 4b, 5a, 5b, 6a, 6b, 7a, 7b, 8a, and 8b. In this SSB to RO mapping rule, one SSB may be associated with more than one ROs, and an interleaving operation is applied to PRACH slot indexes on top of the first to fourth mapping rules.

By virtue of the fifth SSB to RO mapping rule, even if the terminal encounters a LBT failure in two or more consecutive PRACH slots, compared with its counterparts, the terminal may have better chance to find PRACH transmission opportunities corresponding to the SSBs which are mapped to the two or more consecutive PRACH slots in other PRACH slots.

The third, fourth or fifth SSB to RO mapping rule are advantageous in cases where a NR stand-alone system operating in unlicensed bands (e.g., 5 GHz or 6 GHz unlicensed bands) coexists with a Wi-Fi network in which a physical layer protocol data unit (PPDU) duration may be longer than one or more PRACH slot.

In view of the above five mapping rules, more than one SSB to RO mapping rule among the five mapping rules can be used in a process of establishing initial access between a base station and a terminal, according to various embodiments of the present disclosure.

In some embodiment, a higher layer signalling (e.g. RMSI) may be used to indicate which SSB to RO mapping rule will be used in the following PRACH preamble transmission.

In addition, the base station may have knowledge on transmission pattern of overlapping Wi-Fi network. The SSB to RO mapping rule may be adapted according to the transmission pattern of overlapping Wi-Fi network.

Figure 10:
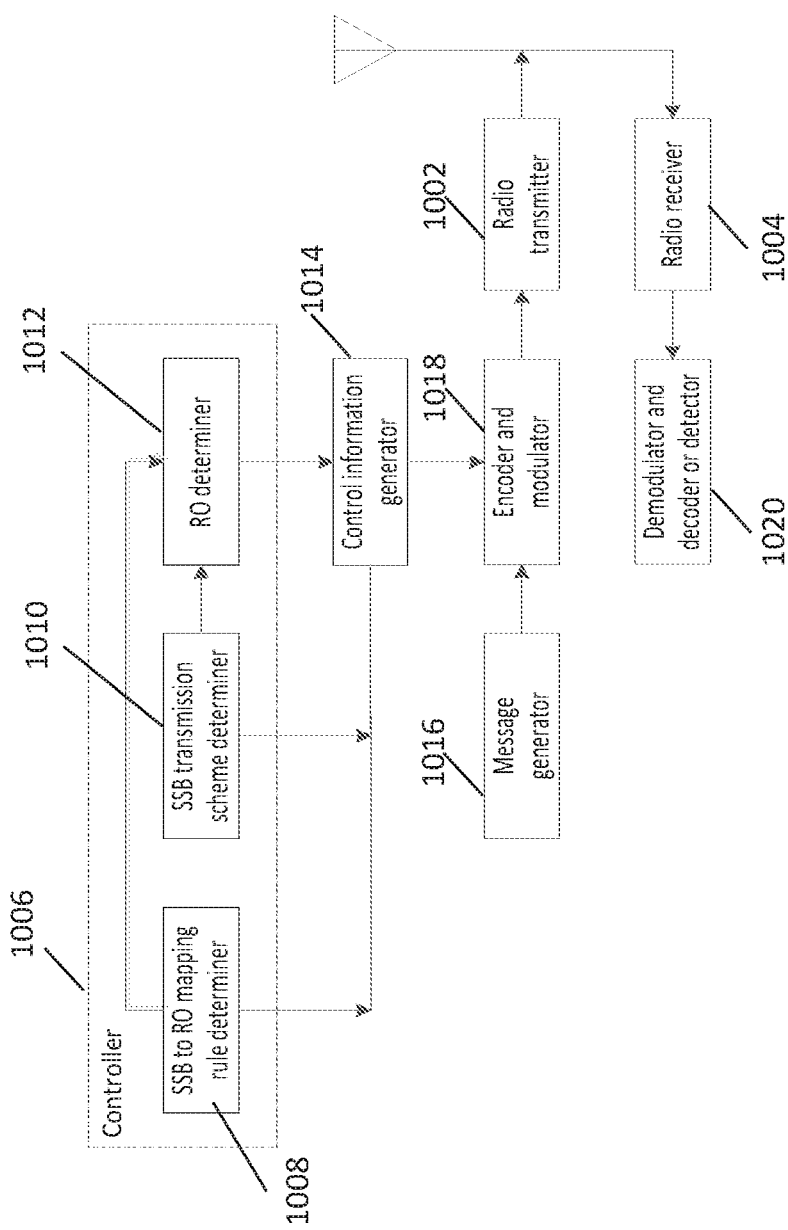
FIG. 10 shows another schematic example of base station for establishing an initial access in accordance with various embodiments as shown in FIGS. 3 to 9.

FIG. 10 shows another schematic example of base station for establishing an initial access in accordance with various embodiments as shown in FIGS. 3 to 9.

In the schematic example of FIG. 10, the at least one controller 1006 of the base station may at least include a SSB to RO mapping rule determiner 1008, a SSB transmission scheme determiner 1010, and a RO determiner 1012. The SSB to RO mapping rule determiner 1008 when in operation may be configured to determine which one of the SSB to RO mapping rules is used. The SSB transmission scheme determiner 1010 when in operation may be configured to determine whether segmented or non-segmented SSB transmission is enabled in a SS burst set period and its related signaling. The RO determiner 1012 when in operation may be configured to determine ROs in SSB COT group or RA COT based on the results from the SSB to RO mapping rule determiner 1008 and the SSB transmission scheme determiner 1010.

In the schematic example of FIG. 10, the base station may further include at least a control information generator 1014, a message generator 1016, an encoder and modulator 1018, and a demodulator and a decoder or detector 1020.

The control information generator 1014 when in operation may be configured to generate control information such as PBCH or RMSI based on the results from the SSB to RO mapping rule determiner 1008, the SSB transmission scheme determiner 1010 and the RO determiner 1012, and accordingly control the radio transmitter 1002.

The message generator 1016 when in operation may be configured to generate RA response messages in response to receipts of PRACH preamble received from the terminal or RRC connection setup messages in response to receipts of RRC connection request messages received from the terminal.

The encoder and modulator 1018 when in operation may be configured to encode and modulate the generated control information received from the control information generator 1014 or messages received from the message generator 1016.

The demodulator and decoder or detector 1020 when in operation may be configured to detect the PRACH preamble received from the terminal or demodulate and decode a RRC connection request message received from the terminal.

Figure 11:
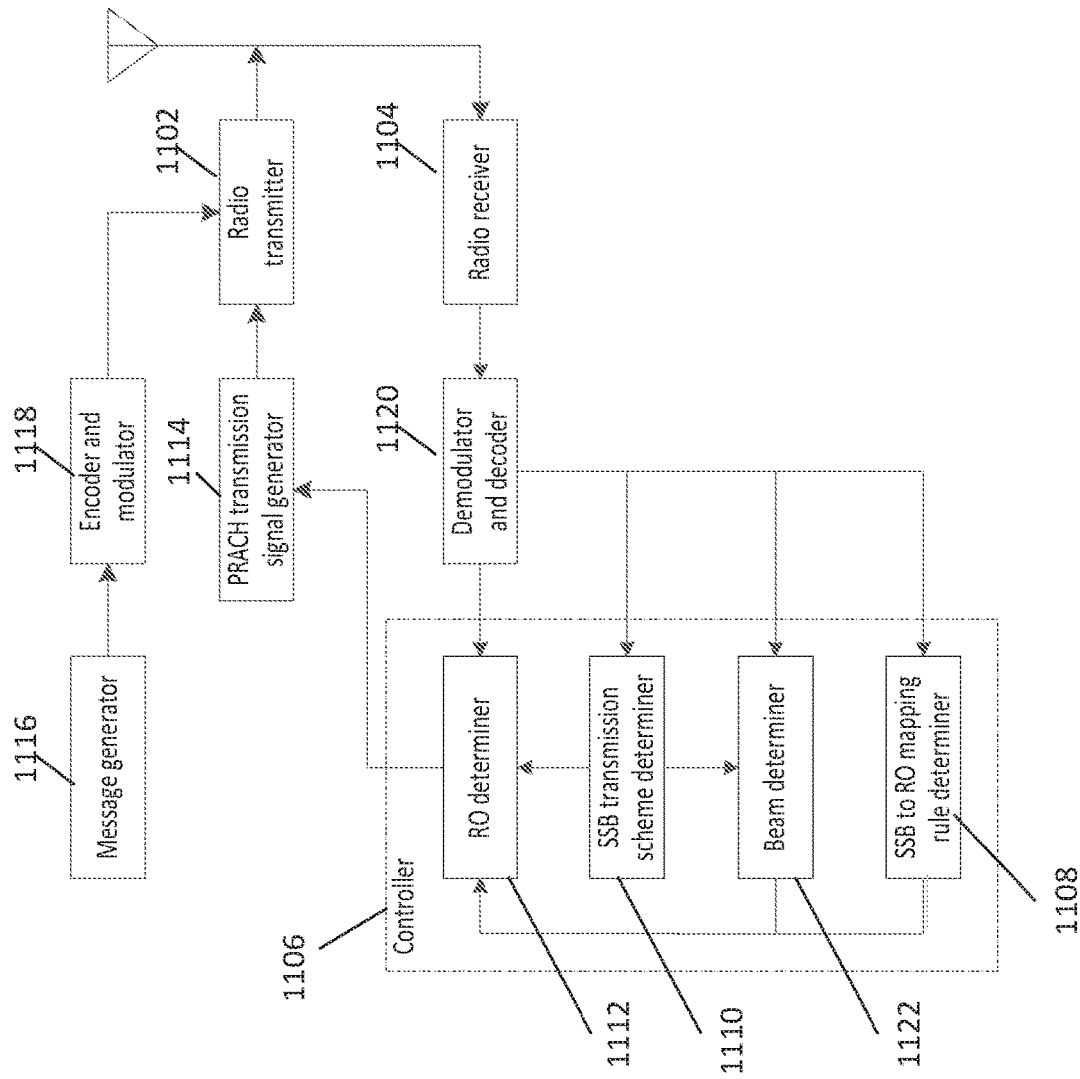
FIG. 11 shows another schematic example of terminal for establishing an initial access in accordance with various embodiments as shown in FIGS. 3 to 9.

FIG. 11 shows another schematic example of terminal for establishing an initial access in accordance with various embodiments as shown in FIGS. 3 to 9.

In the schematic example of FIG. 11, the at least one controller 1106 of the terminal may at least include a SSB to RO mapping rule determiner 1108, a SSB transmission scheme determiner 1110, a RO determiner 1112 and a beam determiner 1122. The SSB to RO mapping rule determiner 1108 when in operation may be configured to determine the SSB to RO mapping rule. The SSB transmission scheme determiner 1110 when in operation may be configured to determine the SSB transmission scheme in a SS burst set period and parse the related signaling. The beam determiner 1122 when in operation may be configured to determine a best beam/SSB or a beam/SSB with a quality that is good enough from SSB beam sweeping. The RO determiner 1112 when in operation may be configured to determine a RO in an SSB COT group or a RA COT associated with the selected SSB.

In the schematic example of FIG. 10, the terminal may further include at least a PRACH transmission signal generator 1114, a message generator 1116, an encoder and modulator 1118, and a demodulator and a decoder 1120.

The PRACH transmission signal generator 1114 when in operation may be configured to generate PRACH transmission signal at the RO determined by the RO determiner 1112 in the controller 1106.

The message generator 1116 when in operation may be configured to generate RRC connection request messages in response to receipts of RA response messages from the base station.

The encoder and modulator 1118 when in operation may be configured to encode and modulate the generated messages received from the message generator 1116 for transmission by the radio transmitter 1102.

The demodulator and decoder 1120 when in operation may be configured to demodulate and decode the received signal (e.g., control information or messages) received from the radio receiver 1104.

As described above, the embodiments of the present disclosure provides an advanced communication system, communication methods and communication apparatuses that enables efficient and reliable communication for establishing initial access and to improve NR DL and UL throughput.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

According to the present disclosure, there is provided various features such as:

1. A terminal for establishing an initial access, the terminal comprising: a receiver which, in operation, is configured to receive candidate synchronization signal/physical broadcast channel blocks (SSBs) in a synchronization signal (SS) burst set, the candidate SSBs being transmitted within one or more SSB channel occupancy time (SSB COT) from a base station; and a transmitter which, in operation, is configured to transmit a physical random access channel (PRACH) preamble on a PRACH occasion (RO) to the base station, the RO being associated with one SSB among the received candidate SSBs.

2. The terminal according to statement 1, wherein the receiver which, in operation, is further configured to receive physical random access channel (PRACH) configuration information being transmitted within the one or more SSB COT.

3. The terminal according to statement 1 or 2, wherein the receiver which, in operation, is further configured to receive an indication of a last of the candidate SSBs in the received candidate SSBs.

4. The terminal according to statement 1, wherein the receiver which, in operation, is further configured to receive a Random Access (RA) response being transmitted within the one or more SSB COT from the base station in response to the transmission of the PRACH preamble from the terminal.

5. The terminal according to any one of statements 1 to 4, wherein the number of the one or more SSB COT is determined according to a result of a listen before talk (LBT) procedure carried out at the base station.

6. The terminal according to statement 5, wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

7. The terminal according to statement 6, wherein the receiver which, in operation, is further configured to: if the number of the one or more SSB COT is one, receive each of the candidate SSBs being assigned with a SSB index that is indexed within the SS burst set; and if the number of the one or more SSB COT is two or more, receive the two or more SSB COTs within one or more SSB COT group, wherein each of the one or more SSB COT group has a duration during which a corresponding number of SSBs among the candidate SSBs are received, and wherein each of the corresponding number of SSBs is assigned with a SSB index that is indexed within the SSB COT group.

8. The terminal according to any one of statements 1 to 7, wherein an interval between each of the candidate SSBs in a SSB COT is shorter than that between each of the candidate SSBs received in another SSB COT of a longer duration.

9. The terminal according to statement 8, wherein the transmitter which, in operation, is further configured to: transmit the PRACH preamble in the RO in response to a receipt of the candidate SSBs received in the one or more SSB COT group, the PRACH preamble being transmitted within each of the one or more SSB COT group.

10. The terminal according to statement 2, further comprising a controller, wherein the controller which, in operation, is configured to determine the RO for each of the candidate SSBs based on the PRACH configuration information received within the one or more SSB COT from the base station.

11. The terminal according to statement 10, wherein the controller which, in operation, is further configured to determine the RO for each of the candidate SSBs based on one or more mapping rules, the one or more mapping rules being between a SSB index of the each of the candidate SSBs and the RO associated with the each of the candidate SSBs.

12. The terminal according to statement 2, further comprising a controller, wherein the controller which, in operation, is configured to: determine if more than one RO are associated with each of the candidate SSBs based on the PRACH configuration information received within the one or more SSB COT.

13. The terminal according to any of the preceding statements, wherein the receiver which, in operation, is further configured to: receive the candidate SSBs transmitted by a plurality of beams from the base station, each of the one or more of the plurality of beams being configured to transmit one of the candidate SSBs.

14. The terminal according to any of the preceding statements, wherein the terminal which, in operation, is further configured to: in response to the receipt of the RA response, transmit, by the transmitter, a connection request message to the base station, and receive, by the receiver, from the base station, a connection setup message in response to the transmission of the connection request message.

15. The terminal according to statement 14, wherein the transmitter which, in operation, is further configured to transmit the connection request message together with the PRACH preamble to the base station, and wherein the receiver which, in operation, is further configured to receive the connection setup message together with the RA response from the base station in response to the connection request message.

16. The terminal according to any one of the preceding statements, wherein the receiver which, in operation, is further configured to: receive the candidate SSBs in a new radio license-assisted access (NR LAA) channel with an interval between each of the candidate SSBs, the interval being shorter than that between each of the candidate SSBs transmitted in a new radio normal (NR-normal) channel.

17. A base station for establishing an initial access, the base station comprising: a transmitter which, in operation, is configured to transmit candidate synchronization signal/ physical broadcast channel blocks (SSBs) in a synchronization signal (SS) burst set within one or more SSB channel occupancy time (SSB COT) to a terminal; and a receiver which, in operation, is configured to receive a physical random access channel (PRACH) preamble on a PRACH occasion (RO) from the terminal, the RO being associated with one SSB among the received candidate SSBs.

18. The base station according to statement 17, wherein the transmitter which, in operation, is further configured to transmit physical random access channel (PRACH) configuration information within the one or more SSB COT.

19. The base station according to statement 18, wherein the transmitter which, in operation, is further configured to transmit an indication of a last of the candidate SSBs in the transmitted candidate SSBs.

20. The base station according to statement 17, wherein the transmitter which, in operation, is further configured to transmit a Random Access (RA) response within the one or more SSB COT in response to the receipt of the PRACH preamble from the terminal.

21. The base station according to any one of statements 17 to 20, wherein the number of the one or more SSB COT is determined according to a result of a listen before talk (LBT) procedure carried out at the base station.

22. The base station according to statement 21, wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

23. The base station according to statement 22, wherein the transmitter which, in operation, is further configured to: if the number of the one or more SSB COT is one, transmit each of the candidate SSBs being assigned with a SSB index that is indexed within the SS burst set; and if the number of the one or more SSB COT is two or more, transmit the two or more SSB COTs within one or more SSB COT group, wherein each of the one or more SSB COT group has a duration during which a corresponding number of SSBs among the candidate SSBs are transmitted, and wherein each of the corresponding number of SSBs is assigned with a SSB index that is indexed within the SSB COT group.

24. The base station according to any one of statements 17 to 23, wherein an interval between each of the candidate SSBs in a SSB COT is shorter than that between each of the candidate SSBs received in another SSB COT of a longer duration.

25. The base station according to statement 23, wherein the receiver which, in operation, is further configured to: receive the PRACH preamble in the RO in response to a receipt of the candidate SSBs received in the one or more SSB COT group, the PRACH preamble being received within the one or more SSB COT group.

26. The base station according to statement 18, further comprising a controller, wherein the controller which, in operation, is configured to: deciding the RO for each of the candidate SSBs, wherein the RO is derivable based on the PRACH configuration information transmitted within the one or more SSB COT.

27. The base station according to statement 26, wherein the controller which, in operation, is configured to: associate the RO with each of the candidate SSBs based on one or more mapping rules, the one or more mapping rules being between a SSB index of the each of the candidate SSBs and the RO associated with the each of the candidate SSBs.

28. The base station according to statement 18, further comprising a controller, wherein the controller which, in operation, is configured to: associate more than one RO with each of the candidate SSBs, and indicate this information in the PRACH configuration information.

29. The base station according to any of statements 17 to 28, wherein the transmitter which, in operation, is further configured to: transmit the candidate SSBs by a plurality of beams to the terminal, each of the one or more of the plurality of beams being configured to transmit one of the candidate SSBs.

30. The base station according to any of statements 17 to 29, wherein the base station which, in operation, is further configured to: receive a connection request message at the receiver from the terminal in response to the transmission of the RA response, and transmit a connection setup message from the transmitter to the terminal in response to the receipt of the connection request message.

31. The base station according to statement 30, wherein the receiver which, in operation, is further configured to receive the connection request message together with the PRACH preamble from the terminal, and wherein the transmitter which, in operation, is further configured to transmit the connection setup message together with the RA response to the terminal in response to the receipt of the connection request message.

32. The base station according to any of statements 17 to 31, wherein the transmitter which, in operation, is further configured to: transmit the candidate SSBs in a new radio license-assisted access (NR LAA) channel with an interval between each of the candidate SSBs, the interval being shorter than that between each of the candidate SSBs transmitted in a new radio normal (NR-normal) channel.

33. A method for establishing an initial access, the method comprising: receiving, at a terminal, candidate synchronization signal/physical broadcast channel blocks (SSBs) in a synchronization signal (SS) burst set, the candidate SSBs being transmitted within one or more SSB channel occupancy time (SSB COT) from a base station; and transmitting, from the terminal, a physical random access channel (PRACH) preamble on a PRACH occasion (RO) to the base station, the RO being associated with one SSB among the received candidate SSBs.

34. A method for establishing an initial access, the method comprising: transmitting, from a base station, candidate synchronization signal/physical broadcast channel blocks (SSBs) in a synchronization signal (SS) burst set within one or more SSB channel occupancy time (SSB COT) to a terminal; and receiving, at the base station, a physical random access channel (PRACH) preamble on a PRACH occasion (RO) from the terminal, the RO being associated with one SSB among the transmitted candidate SSBs.

The invention claimed is:

1. A terminal for establishing an initial access, the terminal comprising:
a receiver which, in operation, is configured to receive candidate synchronization signal/physical broadcast channel blocks (SSBs) in a synchronization signal (SS) burst set, the candidate SSBs being transmitted within one or more SSB channel occupancy time (SSB COT) from a base station; and
a transmitter which, in operation, is configured to transmit a physical random access channel (PRACH) preamble on a PRACH occasion (RO) to the base station, the RO being associated with one SSB among the received candidate SSBs,
wherein the number of the one or more SSB COT is determined according to a result of a listen before talk (LBT) procedure carried out at the base station, and
wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

2. The terminal according to claim 1, wherein the receiver which, in operation, is further configured to:
if the number of the one or more SSB COT is one, receive each of the candidate SSBs being assigned with a SSB index that is indexed within the SS burst set; and
if the number of the one or more SSB COT is two or more, receive the two or more SSB COTs within one or more SSB COT group, wherein each of the one or more SSB COT group has a duration during which a corresponding number of SSBs among the candidate SSBs are received, and wherein each of the corresponding number of SSBs is assigned with a SSB index that is indexed within the SSB COT group.

3. The terminal according to claim 1, wherein the transmitter which, in operation, is further configured to:
transmit the PRACH preamble in the RO in response to a receipt of the candidate SSBs received in the one or more SSB COT group, the PRACH preamble being transmitted within each of the one or more SSB COT group.

4. The terminal according to claim 1, further comprising a controller, wherein the controller which, in operation, is configured to determine the RO associated with each of the candidate SSBs based on one or more mapping rules, the one or more mapping rules being between a SSB index of the each of the candidate SSBs and the RO associated with the each of the candidate SSBs.

5. A base station for establishing an initial access, the base station comprising:
a transmitter which, in operation, is configured to transmit candidate synchronization signal/physical broadcast channel blocks (SSBs) in a synchronization signal (SS) burst set within one or more SSB channel occupancy time (SSB COT) to a terminal; and
a receiver which, in operation, is configured to receive a physical random access channel (PRACH) preamble on a PRACH occasion (RO) from the terminal, the RO being associated with one SSB among the received candidate SSBs,
wherein the number of the one or more SSB COT is determined according to a result of a listen before talk (LBT) procedure carried out at the base station, and
wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

6. The base station according to claim 5, wherein the transmitter which, in operation, is further configured to:
if the number of the one or more SSB COT is one, transmit each of the candidate SSBs being assigned with a SSB index that is indexed within the SS burst set; and
if the number of the one or more SSB COT is two or more, transmit the two or more SSB COTs within one or more SSB COT group, wherein each of the one or more SSB COT group has a duration during which a corresponding number of SSBs among the candidate SSBs are transmitted, and wherein each of the corresponding number of SSBs is assigned with a SSB index that is indexed within the SSB COT group.

7. The base station according to claim 5, wherein the receiver which, in operation, is further configured to:
receive the PRACH preamble in the RO in response to a receipt of the candidate SSBs received in the one or more SSB COT group, the PRACH preamble being received within the one or more SSB COT group.

8. The base station according to claim 5, further comprising a controller, wherein the controller which, in operation, is configured to:
associate the RO with each of the candidate SSBs based on one or more mapping rules, the one or more mapping rules being between a SSB index of the each of the candidate SSBs and the RO associated with the each of the candidate SSBs.

9. A method for establishing an initial access, the method comprising:
receiving, at a terminal, candidate synchronization signal/physical broadcast channel blocks (SSBs) in a synchronization signal (SS) burst set, the candidate SSBs being transmitted within one or more SSB channel occupancy time (SSB COT) from a base station; and
transmitting, from the terminal, a physical random access channel (PRACH) preamble on a PRACH occasion (RO) to the base station, the RO being associated with one SSB among the received candidate SSBs,
wherein the number of the one or more SSB COT is determined according to a result of a listen before talk (LBT) procedure carried out at the base station, and
wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

10. A method for establishing an initial access, the method comprising:
transmitting, from a base station, candidate synchronization signal/physical broadcast channel blocks (SSBs) in a synchronization signal (SS) burst set within one or more SSB channel occupancy time (SSB COT) to a terminal; and
receiving, at the base station, a physical random access channel (PRACH) preamble on a PRACH occasion (RO) from the terminal, the RO being associated with one SSB among the transmitted candidate SSBs,
wherein the number of the one or more SSB COT is determined according to a result of a listen before talk (LBT) procedure carried out at the base station, and
wherein the number of the one or more SSB COT is one if the result of the LBT procedure indicates that a duration of a first of the one or more SSB COT is not less than that required to transmit the candidate SSBs in the SS burst set; otherwise the number of the one or more SSB COT is two or more.

* * * * *